(12) United States Patent
Topliss et al.

(10) Patent No.: US 9,560,247 B2
(45) Date of Patent: Jan. 31, 2017

(54) OPTICAL IMAGE STABILIZATION COMPENSATIONS

(71) Applicant: Apple Inc., Cupertino, CA (US)

(72) Inventors: Richard J. Topliss, Campbell, CA (US); Richard H. Tsai, Cupertino, CA (US); Richard L. Baer, Los Altos, CA (US); David C. Beard, Los Gatos, CA (US); Damien J. Thivent, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 141 days.

(21) Appl. No.: 14/292,441

(22) Filed: May 30, 2014

(65) Prior Publication Data
US 2015/0350507 A1   Dec. 3, 2015

(51) Int. Cl.
*H04N 5/232* (2006.01)
*H04N 5/225* (2006.01)

(52) U.S. Cl.
CPC ........ *H04N 5/2254* (2013.01); *H04N 5/23258* (2013.01); *H04N 5/23287* (2013.01)

(58) Field of Classification Search
CPC ............ H04N 5/23254; H04N 5/23258; H04N 5/23251; H04N 5/23267; H04N 5/2328; H04N 5/23283; G03B 2217/005; G03B 2205/0007; G03B 2205/0023; G03B 2205/0038; G02B 27/64; G02B 27/644; G02B 27/646
See application file for complete search history.

(56) References Cited

U.S. PATENT DOCUMENTS

| | | | | |
|---|---|---|---|---|
| 5,689,369 A | * | 11/1997 | Noguchi | G02B 27/646 348/208.8 |
| 5,844,719 A | * | 12/1998 | Wada | G02B 27/646 348/E5.046 |
| 7,483,056 B2 | * | 1/2009 | Shinohara | H04N 5/217 348/208.7 |
| 7,633,526 B2 | | 12/2009 | Lee et al. | |
| 8,254,769 B2 | * | 8/2012 | Wu | G03B 17/00 348/208.11 |
| 8,320,753 B2 | * | 11/2012 | Lee | G03B 17/00 348/208.11 |
| 8,514,287 B2 | * | 8/2013 | Imagawa | G03B 5/02 348/208.1 |
| 8,531,534 B2 | * | 9/2013 | Hu | G02B 7/08 348/208.11 |
| 8,605,203 B2 | | 12/2013 | Wu et al. | |

(Continued)

*Primary Examiner* — Aung S Moe
(74) *Attorney, Agent, or Firm* — Robert C. Kowert; Meyertons, Hood, Kivlin, Kowert & Goetzel, P.C.

(57) ABSTRACT

Some embodiments include an optical image stabilization system. The optical image stabilization system includes a sensor. The sensor is configured for measuring movements of a camera module stabilized by the optical image stabilization system. Some embodiments further include an optical image stabilization control system for calculating from the movements a calculated position of a moving body. In some embodiments, the moving body is part of a camera module. Some embodiments further include an actuator control for generating electrical signals to move at least two actuators to achieve a calculated position of the moving body. In some embodiments, the actuator control system receives measurements from positions sensors that assess the position of the moving body.

20 Claims, 13 Drawing Sheets

(56) References Cited

U.S. PATENT DOCUMENTS

| | | | |
|---|---|---|---|
| 8,682,150 B2* | 3/2014 | Hosokawa | G03B 3/02 348/208.11 |
| 8,768,156 B2 | 7/2014 | Ohishi | |
| 9,030,141 B2* | 5/2015 | Gu | H02P 7/00 318/400.01 |
| 9,134,587 B2* | 9/2015 | Lim | H02K 41/0356 |
| 9,151,963 B2* | 10/2015 | Sato | G02B 27/64 |
| 9,179,066 B1* | 11/2015 | Tsai | H04N 5/2254 |
| 2006/0018643 A1* | 1/2006 | Stavely | G03B 17/02 396/55 |
| 2006/0018646 A1* | 1/2006 | Stavely | G03B 17/02 396/55 |
| 2007/0058958 A1* | 3/2007 | Enomoto | G03B 5/00 396/55 |
| 2007/0127904 A1* | 6/2007 | Iwasaki | G02B 7/10 396/55 |
| 2007/0236577 A1* | 10/2007 | Ke | G03B 5/00 348/208.99 |
| 2007/0263996 A1* | 11/2007 | Iwasaki | G02B 27/646 396/55 |
| 2008/0002957 A1* | 1/2008 | Ziemkowski | G03B 17/02 396/55 |
| 2008/0055421 A1* | 3/2008 | Kimura | G02B 27/646 348/208.99 |
| 2009/0085558 A1* | 4/2009 | David | G01D 5/145 324/207.2 |
| 2010/0026288 A1* | 2/2010 | Sauber | B82Y 25/00 324/252 |
| 2010/0079604 A1* | 4/2010 | Washisu | G02B 7/08 348/208.4 |
| 2010/0097020 A1* | 4/2010 | Kiyamura | H02P 6/14 318/400.11 |
| 2010/0098394 A1* | 4/2010 | Ishihara | G02B 27/646 396/55 |
| 2010/0195206 A1* | 8/2010 | Miyamori | G02B 27/646 359/557 |
| 2010/0290769 A1* | 11/2010 | Nasiri | G03B 17/00 396/55 |
| 2011/0149112 A1* | 6/2011 | Muukki | H04N 5/23248 348/231.6 |
| 2012/0014681 A1* | 1/2012 | Miyahara | G02B 27/646 396/55 |
| 2012/0099201 A1* | 4/2012 | Chan | G02B 27/646 359/557 |
| 2012/0154614 A1* | 6/2012 | Moriya | G03B 3/10 348/208.5 |
| 2012/0163784 A1* | 6/2012 | Saito | G02B 27/646 396/55 |
| 2012/0182472 A1* | 7/2012 | Inata | G03B 5/00 348/374 |
| 2012/0327293 A1* | 12/2012 | Ollila | G02B 7/36 348/362 |
| 2013/0300336 A1* | 11/2013 | Ishikawa | G03B 5/00 318/610 |
| 2014/0009631 A1* | 1/2014 | Topliss | G02B 27/646 348/208.11 |
| 2014/0086568 A1* | 3/2014 | Nomura | G02B 27/646 396/55 |
| 2014/0086569 A1* | 3/2014 | Nomura | G02B 27/646 396/55 |
| 2014/0125824 A1* | 5/2014 | Takizawa | G03B 5/00 348/208.3 |
| 2014/0125825 A1* | 5/2014 | Baer | H04N 5/23277 348/208.5 |
| 2014/0139695 A1* | 5/2014 | Kawai | H04N 5/23248 348/208.99 |
| 2014/0218799 A1* | 8/2014 | Suzuka | G02B 13/0065 359/557 |
| 2015/0212336 A1* | 7/2015 | Hubert | G02B 27/646 348/208.11 |
| 2015/0319365 A1* | 11/2015 | Lloyd | H04N 5/23258 348/208.11 |
| 2015/0350507 A1* | 12/2015 | Topliss | H04N 5/2328 348/208.2 |
| 2015/0350549 A1* | 12/2015 | Gregory | H04N 5/23287 348/208.5 |
| 2015/0358528 A1* | 12/2015 | Brodie | H04N 5/2254 348/345 |
| 2015/0365568 A1* | 12/2015 | Topliss | G02B 7/08 348/360 |
| 2016/0070270 A1* | 3/2016 | Beard | G05D 3/14 318/647 |

* cited by examiner

OPTICAL IMAGE STABILIZATION COMPENSATIONS

BACKGROUND

Technical Field

This disclosure relates generally to compensation for the impact of vibration when managing the motion of camera components.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (optical image stabilization) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis (referred to as the Z axis) of the camera to refocus the camera. In addition, high image quality is easier to achieve in small form factor cameras if lens motion along the optical axis is accompanied by minimal parasitic motion in the other degrees of freedom, for example on the X and Y axes orthogonal to the optical (Z) axis of the camera. Thus, some small form factor cameras that include autofocus mechanisms may also incorporate optical image stabilization (optical image stabilization) mechanisms that may sense and react to external excitation/disturbance by adjusting location of the optical lens on the X and/or Y axis in an attempt to compensate for unwanted motion of the lens.

SUMMARY OF EMBODIMENTS

Some embodiments include an optical image stabilization system. The optical image stabilization system includes a sensor. The sensor is configured for measuring movements of a camera module stabilized by the optical image stabilization system. Some embodiments further include an optical image stabilization control system for calculating from the movements a desired position of a moving body. In some embodiments, the moving body is part of a camera module. Some embodiments further include an actuator control for generating electrical signals to move at least two actuators to achieve a desired position of the moving body. In some embodiments, the actuator control system receives measurements from positions sensors that assess the position of the moving body.

Figure 1:
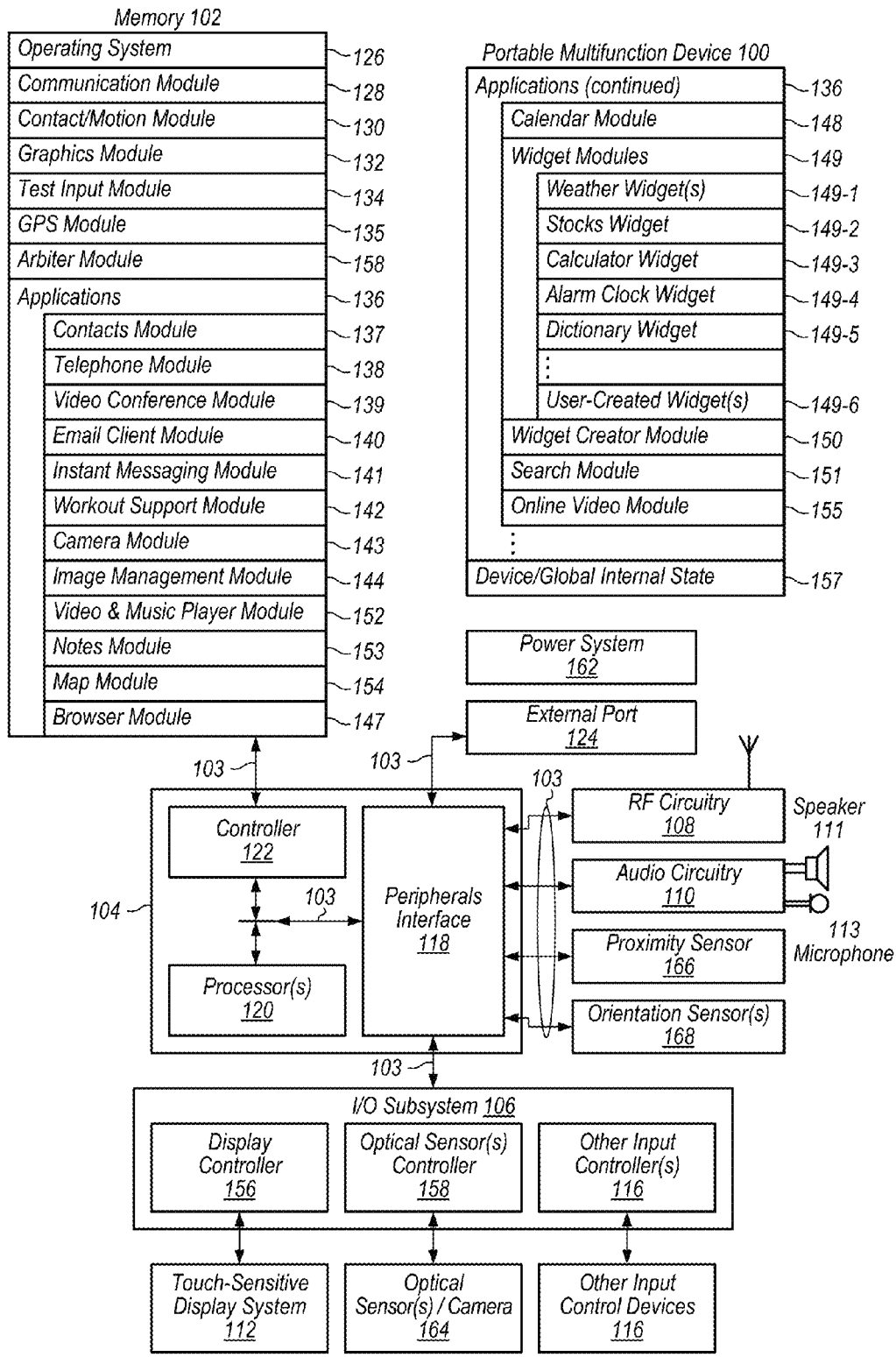
FIG. 1 illustrates a block diagram of a portable multifunction device with a camera in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values.

The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction to Motion Compensation for Camera Modules

Some embodiments include camera equipment outfitted with controls to improve the position accuracy of a miniature actuation mechanism for a compact camera module. More specifically, in some embodiments, compact camera modules include actuators to deliver functions such as autofocus (AF) and optical image stabilization (optical image stabilization). One approach to delivering a very compact actuator for optical image stabilization is to use a Voice Coil Motor (VCM) arrangement. In this arrangement, plural magnets are bonded to the moving body of the optical image stabilization actuator. For size and efficiency reason, these magnets are also used as part of the AF actuator housed inside the moving body of the optical image stabilization actuator. An arrangement of coils is mounted on the fixed body of the optical image stabilization actuator, along with an arrangement of sensors.

For optical image stabilization, it is embodiments are frequently implemented in systems with two independent actuators moving the moving body of the optical image stabilization actuator in two orthogonal directions. Hence it is sometimes useful to employ at least two sensors, to detect the position of the moving body of the optical image stabilization actuator in each of the directions. As current is applied to the optical image stabilization coils, the magnetic field generated interacts with the magnetic field of the magnets to generate forces that move the moving body in the calculated manner. As the magnet moves, this changes the magnetic field through the (for example, Hall) sensor, which in turn alters the voltage across the sense terminals of the sensor.

Some embodiments allow the Hall sensor output voltage to be very well correlated to the position of the moving body, such that the Hall sensor output can be used as a measure of position, and be used to feedback the position, and allow more accurate positioning. Using a voice coil motor, in some embodiments the forces generated are substantially linear with applied current, and hence assuming the moving body is suspended on the fixed body using substantially linear springs, the position of the moving body is substantially proportional to the applied voice coil motor current.

Some embodiments include an optical image stabilization system. The optical image stabilization system includes a sensor. The sensor is configured for measuring movements of a camera module stabilized by the optical image stabilization system. Some embodiments further include an optical image stabilization control system for calculating from the movements a calculated position of a moving body. In some embodiments, the moving body is part of a camera module. Some embodiments further include an actuator control for generating electrical signals to move at least two actuators to achieve a calculated position of the moving body. In some embodiments, the actuator control system receives measurements from positions sensors that assess the position of the moving body.

In some embodiments, the optical image stabilization actuators comprise voice coil motors. In some embodiments, the voice coil motors comprise magnets for moving the moving body. In some embodiments, the position sensors comprise at least two Hall sensors, one for each actuator axis. In some embodiments, each of the Hall sensors detects one component of the magnetic field produced by one magnet used for the actuator of each actuator axis.

In some embodiments, a current applied to the actuators adjusts a voltage sensed by the Hall sensors so as to compensate for the effects of crosstalk between the axes. In some embodiments, drive signals applied to the actuators adjust the measurements from the position sensors so as to improve assessment of the position of the moving body.

In some embodiments, drive signals applied to the actuators compensate for crosstalk between the axes of the actuators. In some embodiments, open loop drive signals applied to the actuators adjust the measurements from the position sensors so as to improve the assessment of the position of the moving body and improve assessment of the position of the moving body. In some embodiments, the movements of the camera module stabilized by the optical image stabilization system include movements resulting from user hand shake.

Some embodiments employ one or more algorithms implemented in a system used to deliver Optical Image Stabilization (OIS) in miniature cameras. In some embodiments, the position sensors used in such OIS systems enable closed-loop position control. In some embodiments, the position sensors used are Hall Sensors, which detect the magnet field and changes in this field as the actuator moves. However, as will be realized by one of skill in the art in light of having read the present disclosure, other embodiments will be applicable to other sensing technologies, such as optical sensors, without departing from the scope and intent of the present disclosure.

In some embodiments, the OIS system consists of several elements:

1. A sensor to detect user handshake or other undesirable source of camera movement.
2. An OIS controller which takes continual information from the handshake sensor and determines a time varying desired position of a moving body to most optimally compensate for the handshake.
3. An Actuator controller which as input takes the desired position of the Moving Body as determined by the OIS controller and outputs time varying commands to the at least one Actuator driver to move the Moving Body.
4. An actuator with at least two separately controllable degrees of freedom to move the moving body.
5. Position sensors to monitor the position of the moving body and feed this information back to the Actuator controller on request so as to allow the Actuator controller to most optimally alter the drive signals to the Actuator to best best achieve the desired position as determined by the OIS controller.

In some embodiments, the handshake sensor is a MEMS gyroscope, which natively detects changes in angular velocity, angular changes to the camera position produce the greatest reduction in image quality, and hence are most desirable to compensate for. In some embodiments, the moving body specifically includes the camera lens, but not the camera image sensor, and the directions of motion of the OIS actuator are such that the actuator moves the lens relative to the image sensor substantially in linear directions orthogonal to the lens optical axis.

An alternative configuration, which may be preferred in embodiments designed for different system constraints, is for the moving body to include both the lens and image sensor, and for the actuator to tilt the moving body about axes orthogonal to the lens optical axis.

A further alternative embodiment that may be chosen for different system constraints is for the moving body to include only one group of lens elements, which are moved by the actuator in linear directions orthogonal to the optical axis, where at least one further group of lens elements remains stationary relative to the image sensor.

As discussed, in some embodiments, the position sensors, which detect the position of the moving body are Hall sensors. In some embodiments, the Hall sensors are fixed relative to the image sensor, and the moving body include magnets, from which the magnetic fields generated, and their change in position, are detected by the Hall sensors, and hence the position of the moving body is determined.

Hall sensors are frequently used with actuators based on the Voice Coil Motor (VCM), since permanent magnets are already a part of the actuator. In some embodiments, the magnets on the moving body are the same magnets used in conjunction with the coils to produce the Lorentz forces required to move the moving body. However, as will be realized by one of skill in the art in light of having read the present disclosure, other embodiments will be applicable to other sensing technologies, such as optical sensors, without departing from the scope and intent of the present disclosure.

In some embodiments, the Hall sensors are mounted on the image sensor substrate, in close proximity to the driver IC, to which they are connected. In some embodiments, the driver IC is a programmable current source, which for some embodiments includes three current driver outputs; one for each OIS axis, and one for the separate auto-focus mechanism. In some embodiments, the driver IC then communicates with the actuator controller, which executes on a processor outside the camera module, and communicate with the driver IC via some kind of digital communication interface, such as I2C. In addition, in some embodiments, the driver IC connects to each Hall sensor (at least one for each OIS axis); applying the driving current, and sensing the generated voltage due to the Hall effect. In some embodiments, this voltage is amplified, converted to a digital signal, stored, and potentially then averaged with other such Hall sensor readings collected over time, until such time as the actuator controller requests the Hall sensor information, at which point the driver IC relays the information over the digital interface to the actuator controller.

In some embodiments, an OIS system includes a sensor for measuring user handshake, an OIS control system for reading the measured user handshake and calculating a desired position of a moving body that is part of a camera module, and an actuator control system for generating desired electrical signals to move at least two actuators to achieve the desired position of the moving body. In some embodiments, the actuator control system also receives measurements from positions sensors that assess the position of the moving body. In some embodiments, a camera module that includes a lens, digital image sensor and OIS actuators to move the moving body may incorporate all or part of the lens and/or image sensor so as to compensate for the handshake. In some embodiments, the open loop drive signals applied to the OIS actuators are used to adjust measurements from the position sensors so as to improve the assessment of the position of the moving body and compensate for crosstalk between the axes of the OIS actuators.

In some embodiments, the OIS actuators are voice coil motors (VCM); the magnets for the VCMs move with the moving body, and the position sensors are at least two Hall sensors, one for each actuator axis, which each detects one component of the magnetic field produced by one magnet used for the actuator of each axis.

In some embodiments, the current applied the OIS VCM actuators is used to adjust the voltage sensed by the Hall sensors so as to compensate for the effects of crosstalk between the axes.

Some embodiments include an OIS system that includes a sensor for measuring user handshake, an OIS control system for reading the measured user handshake and calculating a desired position of a moving body that is part of a camera module, and an actuator control system for generating desired electrical signals to move at least two actuators to achieve the desired position of the moving body. In some embodiments, this actuator control system also receives measurements from positions sensors that assess the position of the moving body. Some embodiments include a camera module that includes a lens, digital image sensor and OIS actuators to move the moving body that may incorporate all or part of the lens and/or image sensor so as to compensate for the handshake. In some embodiments, the camera module is calibrated during manufacture to record, for multiple recorded positions of the moving body, the applied open loop drive signals to the OIS actuators and the position sensor measurements, so as to account for manufacturing variations in sensitivity, offset, linearity, crosstalk and actuator line of action.

In some embodiments, the OIS actuators are Voice Coil Motors (VCM), the magnets for the VCMs move with the moving body, and the position sensors are at least two Hall sensors, one for each actuator axis, which each detect one component of the magnetic field produced by one magnet used for the actuator of each axis.

Some embodiments an algorithm to recover from mechanical changes to the camera module that would render the calibration values incorrect. In some embodiments, the recovery algorithm includes a procedure to assess whether a change has occurred that invalidates the calibrated values, and subsequently includes moving the moving body to multiple separate positions by applying different drive signals to the two OIS actuators and then recording measurements from the position sensors.

Some embodiments include a camera module. In some embodiments, the camera module includes a lens, a digital image sensor, and optical image stabilization actuators to move a moving body so as to compensate for handshake. Some embodiments include a position sensor. In some embodiments, the position sensor is configured for measuring movements of a camera module stabilized by the optical image stabilization system. Some embodiments include an optical image stabilization control system for calculating from the movements a calculated position of the moving body. Some embodiments include an actuator control for generating calculated electrical signals to move at least two actuators to achieve the calculated position of the moving body. In some embodiments, the actuator control system receives measurements from positions sensors that assess the position of the moving body.

In some embodiments, open loop drive signals applied to the optical image stabilization actuators are used to adjust the measurements from the position sensor so as to improve the assessment of the position of the moving body and compensate for crosstalk between the axes of the optical image stabilization actuators.

In some embodiments, the optical image stabilization actuators comprise voice coil motors. In some embodiments, the voice coil motors comprise magnets for moving the moving body. In some embodiments, the position sensors comprise at least two Hall sensors, one for each actuator axis. In some embodiments, each of the Hall sensors detects one component of the magnetic field produced by one magnet used for the actuator of each actuator axis.

In some embodiments, a current applied to the actuators adjusts a voltage sensed by the Hall sensors so as to compensate for the effects of crosstalk between the axes. In some embodiments, drive signals applied to the actuators adjust the measurements from the position sensors so as to improve assessment of the position of the moving body.

In some embodiments, drive signals applied to the actuators compensate for crosstalk between the axes of the actuators. In some embodiments, open loop drive signals applied to the actuators adjust the measurements from the position sensors so as to improve the assessment of the position of the moving body and improve assessment of the position of the moving body.

Some embodiments include an optical image stabilization system. In some embodiments, the optical image stabilization system includes a sensor for measuring user handshake, an optical image stabilization control system for, based at least in part upon the measured user handshake, calculating a calculated position of a moving body and an actuator control system for generating calculated electrical signals to move at least two actuators to achieve the calculated position of the moving body, wherein the actuator control system also receives measurements from positions sensors to assess the position of the moving body.

In some embodiments, the optical image stabilization system is incorporated into a camera module including a lens, a digital image sensor, and optical image stabilization actuators to move the moving body. In some embodiments, the camera module is calibrated during manufacture to record, for multiple recorded positions of the moving body, the applied open loop drive signals to the optical image stabilization actuators and the position sensor measurements.

In some embodiments, the optical image stabilization actuators comprise voice coil motors, the voice coil motors include magnets for moving the moving body, and the position sensors comprise at least two Hall sensors, one for each actuator axis.

In some embodiments, each Hall sensor detects one component of the magnetic field produced by one magnet used for the actuator of each axis. Some embodiments further comprise a computer readable medium storing program instructions, which, when executed, cause the optical image stabilization system perform recovering from mechanical changes to the camera module that render stored calibration values incorrect.

In some embodiments, the computer readable medium further stores program instructions which, when executed, perform assessing whether a change has occurred that invalidates stored calibration values, and moving the moving body to multiple separate positions by applying different drive signals to the two optical image stabilization actuators and then recording measurements from the position sensors at each of the positions.

Multifunction Device Examples

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with cameras. FIG. 1 is a block diagram illustrating portable multifunction device 100 with camera 164 in accordance with some embodiments. Camera 164 is sometimes called an "optical sensor" for convenience, and may also be known as or called an optical sensor system. Device 100 may include memory 102 (which may include one or more computer readable storage mediums), memory controller 122, one or more processing units (CPU's) 120, peripherals interface 118, RF circuitry 108, audio circuitry 110, speaker 111, touch-sensitive display system 112, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 28 may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an example embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an example embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions calculated by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors or cameras 164. FIG. 28 shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 28 shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1 shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

Figure 3:
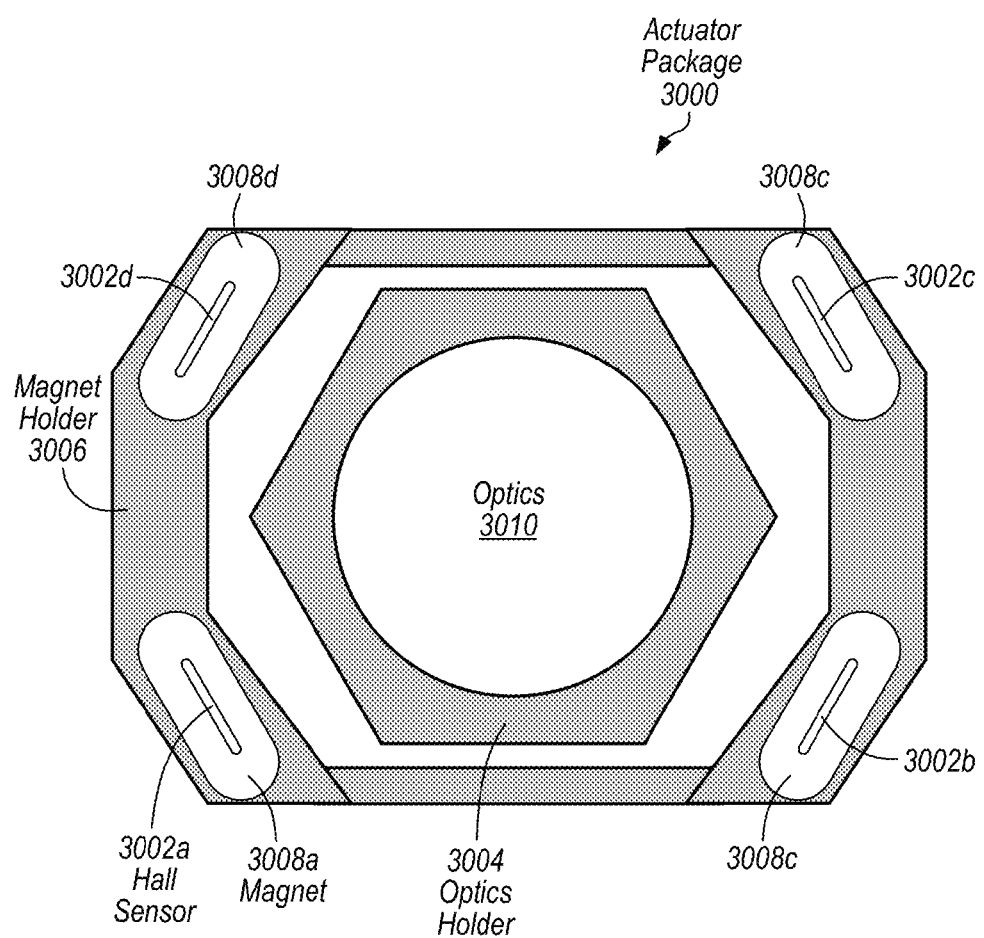
FIG. 3 illustrates a top view of an example embodiment of an actuator module or assembly that may, for example, be used in small form factor cameras, according to at least some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, arbiter module 157 and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which may be made up of a video player
  module and a music player module;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 2:
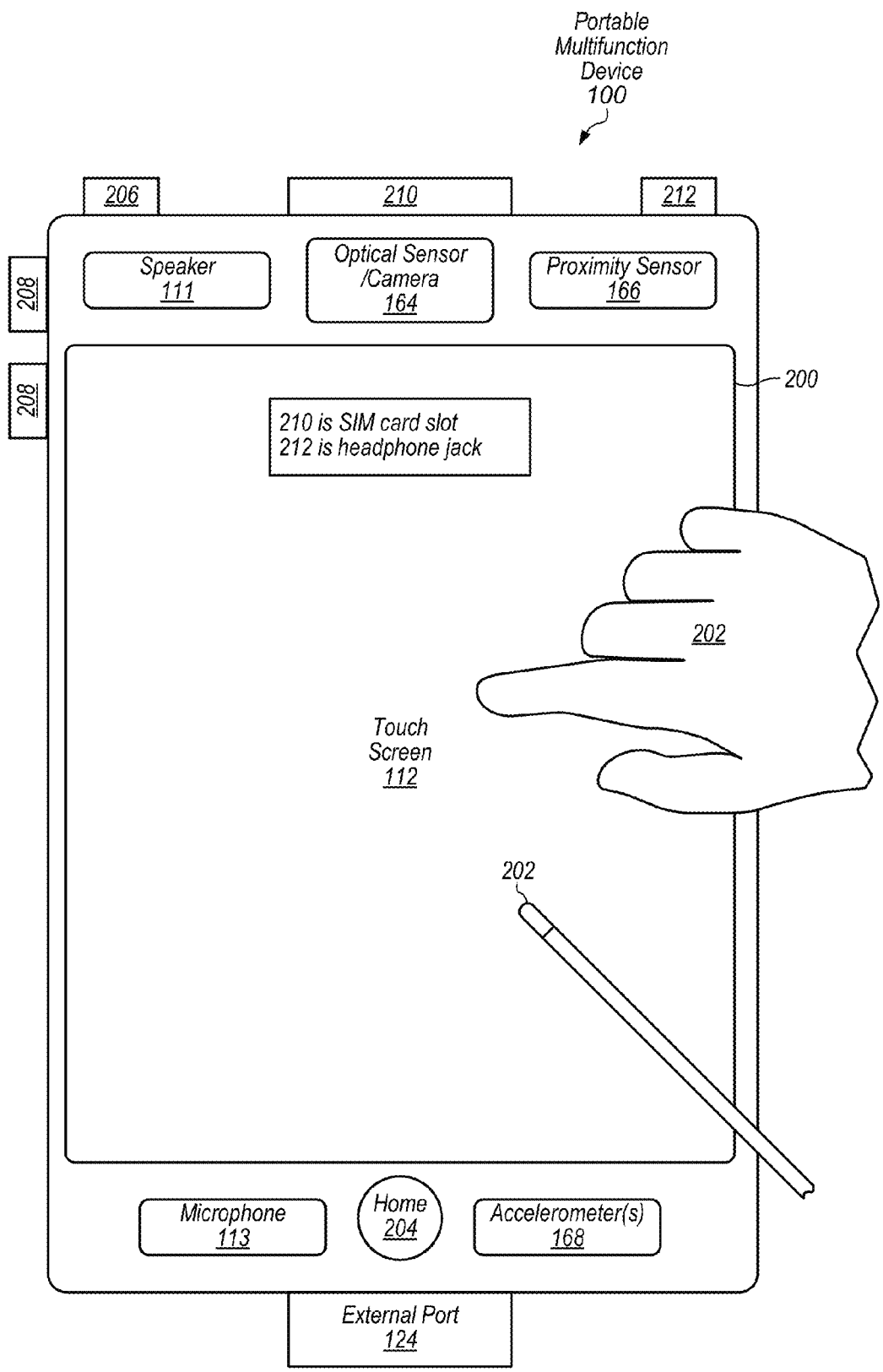
FIG. 2 depicts a portable multifunction device having a camera in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the examples herein are given with reference to optical sensor/camera 164 (on the front of a device), a rear-facing camera or optical sensor that is pointed opposite from the display may be used instead of or in addition to an optical sensor/camera 164 on the front of a device.

Figure 4:
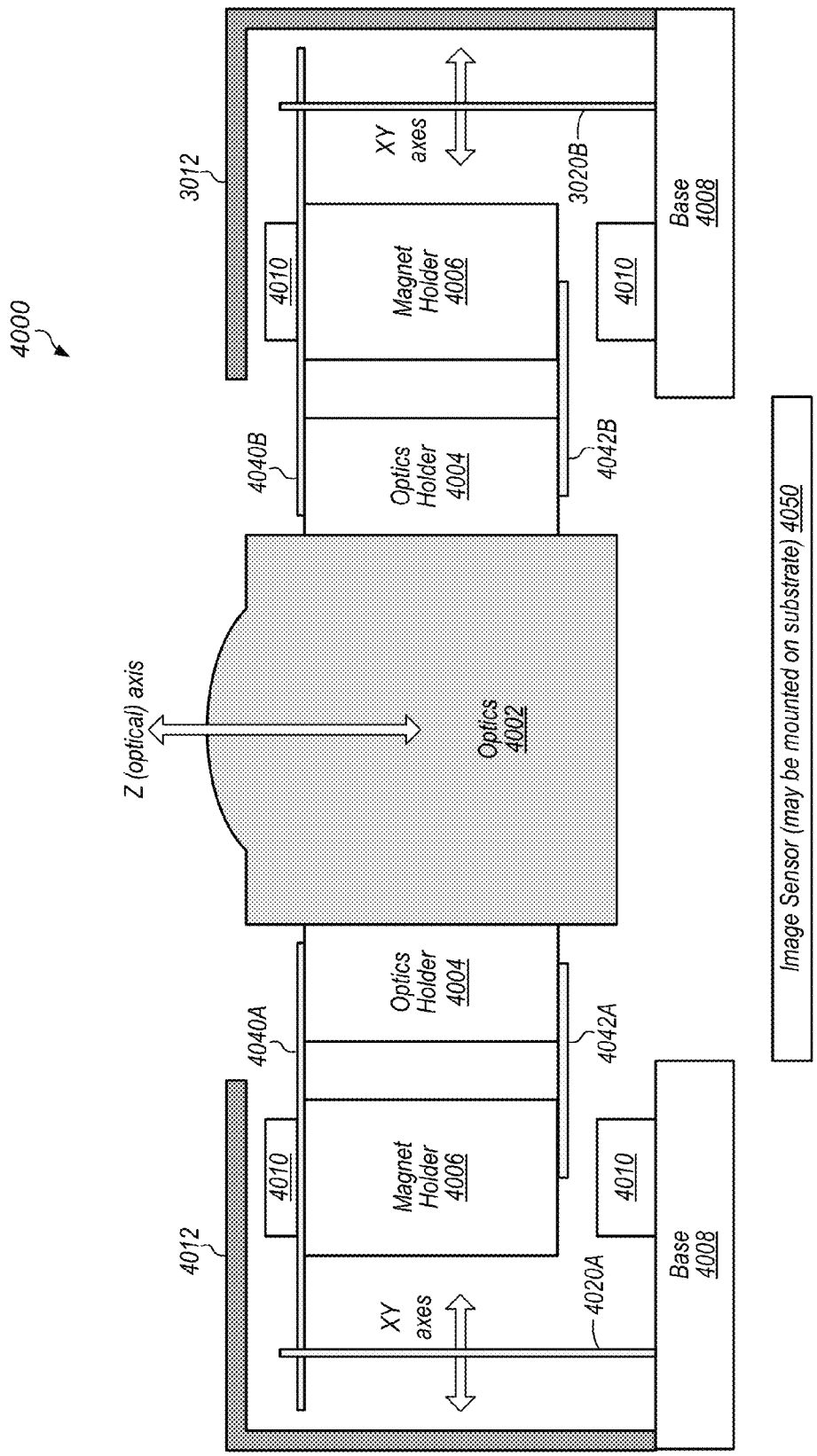
FIG. 4 depicts a side view of an example embodiment of an actuator module or assembly that may, for example, be used in small form factor cameras, according to at least some embodiments.

FIGS. 3-4 illustrate embodiments of an example actuator assembly in which embodiments of compensation as described herein may be applied. FIG. 3 illustrates a top view of an example embodiment of an actuator module or assembly that may, for example, be used in small form factor cameras, according to at least some embodiments. An optics assembly 3010 is held in an optics holder 3004 of an actuator package 3000. A magnet holder 3006 holds magnets 3008a-3008d and Hall sensors 3002a-3002d.

FIG. 4 depicts a side view of an example embodiment of an actuator module or assembly that may, for example, be used in small form factor cameras, according to at least some embodiments. In particular, embodiments of compensation may be applied within an actuator package or assembly 4000 as illustrated in FIGS. 3 and 4 to stabilize and increase control performance of an optics assembly 4000 suspended on wires 4020 within an actuator package 3000 as shown in FIG. 3. Details of example embodiments, implementations, and methods of operations of optical image stabilization actuators and associated sensors such as the example actuator package 3000 shown in these FIGs are discussed below with respect to FIGS. 5-10.

Each magnet (e.g., in magnet holder 4006) is poled so as to generate a magnetic field, the useful component of which for the autofocus function is orthogonal to the optical axis of the camera/lens optics 4002, and orthogonal to the plane of each magnet proximate to the autofocus coil, and where the field for all four magnets are all either directed towards the autofocus coil (e.g., in optics holder 4004), or away from it, so that the Lorentz forces from all four magnets act in the same direction along the optical axis.

FIG. 4 shows a side view of an example embodiment of an actuator module or assembly 4000 that may, for example, be used in small form factor cameras, according to at least some embodiments, and in which embodiments of compensation may be applied. As shown in FIG. 4, an actuator package 4000 may include a base assembly 4008, an optics assembly 4002, and a cover 4012. Base assembly 4008 may include one or more of, but is not limited to, a base 4008, one or more magnet displacement sensors (Hall sensors) 4010, and suspension wires 4020. In at least some embodiments, there are four suspension wires 4020. An optics assembly 4002 may be suspended on the base assembly 4008 by suspension of the upper springs 4040 of optics assembly 4000 on the suspension wires 4020. Optics assembly 4000 may include one or more of, but is not limited to, optics 4002, optics holder 4004, magnet holder(s) 4006, upper spring(s) 4040, and lower spring(s) 4042. The upper and lower spring(s) may be collectively referred to herein as optics springs. In optics assembly 4000, an optics 4002 component (e.g., a lens or lens assembly) may be screwed, mounted or otherwise held in or by an optics holder 4004. In at least some embodiments, the optics 4002/optics holder 4004 assembly may be suspended from or attached to the magnet holder 4006 by upper spring(s) 4040, and lower spring(s) 4042. Note that upper spring(s) 4040 and lower spring(s) 4042 are flexible to allow the optics assembly 4000 a range of motion along the Z (optical) axis for optical focusing, wires 4020 are flexible to allow a range of motion on the XY plane orthogonal to the optical axis for optical image stabilization.

Note that, in some embodiments, an optics assembly 4000 of an actuator assembly may not include magnets and magnet holder(s) 4006, but may include a yoke or other structure 4006 that may be used to help support the optics assembly on suspension wires 4020 via upper springs 4030. However in some embodiments, optics assembly 4000 may not include elements 4006. In general, other embodiments of an optics assembly 4000 may include fewer or more components than the example optics assembly 4000 shown in FIG. 4. Also note that, while embodiments show the optics assembly 4000 suspended on wires 4020, other mechanisms may be used to suspend an optics assembly 4000 in other embodiments.

The autofocus yoke (e.g., magnet holder(s) 4006) acts as the support chassis structure for the autofocus mechanism of actuator 4000. The lens carrier (optics holder 4004) is suspended on the autofocus yoke by an upper autofocus (AF) spring 4040 and a lower optics spring 4042. In this way when an electric current is applied to the autofocus coil, Lorentz forces are developed due to the presence of the four magnets, and a force substantially parallel to the optical axis is generated to move the lens carrier, and hence lens, along the optical axis, relative to the support structure of the autofocus mechanism of the actuator, so as to focus the lens. In addition to suspending the lens carrier and substantially eliminating parasitic motions, the upper spring 4040 and lower spring 4042 also resist the Lorentz forces, and hence convert the forces to a displacement of the lens. This basic architecture shown in FIGS. 3-4 and is typical of some embodiments, in which optical image stabilization function includes moving the entire autofocus mechanism of the actuator (supported by the autofocus yoke) in linear directions orthogonal to the optical axis, in response to user handshake, as detected by some means, such a two or three axis gyroscope, which senses angular velocity. The handshake of interest is the changing angular tilt of the camera in 'pitch and yaw directions', which can be compensated by said linear movements of the lens relative to the image sensor.

At least some embodiments may achieve this two independent degree-of-freedom motion by using two pairs of optical image stabilization coils, each pair acting together to deliver controlled motion in one linear axis orthogonal to the optical axis, and each pair delivering controlled motion in a direction substantially orthogonal to the other pair. In at least some embodiments, these optical image stabilization coils may be fixed to the camera actuator support structure, and when current is appropriately applied, optical image stabilization coils may generate Lorentz forces on the entire autofocus mechanism of the actuator, moving it as calculated. The required magnetic fields for the Lorentz forces are produced by the same four magnets that enable to the Lorentz forces for the autofocus function. However, since the directions of motion of the optical image stabilization movements are orthogonal to the autofocus movements, it is the fringing field of the four magnets that are employed, which have components of magnetic field in directions parallel to the optical axis.

Returning to FIGS. 3-4, in at least some embodiments, the suspension of the autofocus mechanism on the actuator 4000 support structure may be achieved by the use of four corner wires 4020, for example wires with a circular cross-section. Each wire 4020 acts as a flexure beams capable of bending with relatively low stiffness, thus allowing motion in both optical image stabilization degrees-of-freedom. However, wire 4020 is in some embodiments relatively stiff in directions parallel to the optical axis, as this would require the wire to stretch or buckle, thus substantially preventing parasitic motions in these directions. In addition, the presence of four such wires, appropriately separated allows them to be stiff in the parasitic tilt directions of pitch and yaw, thus substantially preventing relative dynamic tilt between the lens and image sensor. This may be seen by appreciating that each wire 4020 is stiff in directions that require it to change in length, and hence the fixed points at the ends of each wire (eight points in total) will substantially form the vertices of a parallelepiped for all operational positions of the optical image stabilization mechanism.

In some embodiments, an OIS system includes a sensor (e.g., one or more of Hall sensors 4010) for measuring user handshake, an OIS control system (e.g., camera module 143 FIGS. 1-2) for reading the measured user handshake and calculating a desired position of a moving body that is part of a camera module, and an actuator control system (e.g., camera module 143 of FIGS. 1-2) for generating desired electrical signals to move at least two actuators (e.g., the autofocus coil in optics holder 4004) to achieve the desired position of the moving body (optics module 4002). In some embodiments, the actuator control system also receives measurements from positions sensors (not shown) that assess the position of the moving body. In some embodiments, a camera module that includes a lens, digital image sensor and OIS actuators to move the moving body may incorporate all or part of the lens and/or image sensor so as to compensate for the handshake. In some embodiments, the open loop drive signals applied to the OIS actuators are used to adjust the measurements from the position sensors so as to improve the assessment of the position of the moving body and compensate for crosstalk between the axes of the OIS actuators.

In some embodiments, the OIS actuators are voice coil motors (VCM); the magnets for the VCMs move with the moving body, and the position sensors are at least two Hall sensors, one for each actuator axis, which each detects one component of the magnetic field produced by one magnet used for the actuator of each axis.

In some embodiments, the current applied the OIS VCM actuators is used to adjust the voltage sensed by the Hall sensors so as to compensate for the effects of crosstalk between the axes.

Some embodiments include an OIS system that includes a sensor for measuring user handshake (e.g., one or more of Hall sensors 4010), an OIS control system (e.g., camera module 143 FIGS. 1-2) for reading the measured user handshake and calculating a desired position of a moving body that is part of a camera module, and an actuator control system (e.g., camera module 143 FIGS. 1-2) for generating desired electrical signals to move at least two actuators to achieve the desired position of the moving body (e.g. optics module 4002). In some embodiments, this actuator control system also receives measurements from positions sensors that assess the position of the moving body. Some embodiments include a camera module that includes a lens, digital image sensor and OIS actuators to move the moving body that may incorporate all or part of the lens and/or image sensor so as to compensate for the handshake. In some embodiments, the camera module is calibrated during manufacture to record, for multiple recorded positions of the moving body, the applied open loop drive signals to the OIS actuators and the position sensor measurements, so as to account for manufacturing variations in sensitivity, offset, linearity, crosstalk and actuator line of action.

In some embodiments, the OIS actuators are Voice Coil Motors (VCM), the magnets for the VCMs move with the moving body, and the position sensors are at least two Hall sensors, one for each actuator axis, which each detect one component of the magnetic field produced by one magnet used for the actuator of each axis.

Some embodiments an algorithm to recover from mechanical changes to the camera module that would render the calibration values incorrect. In some embodiments, the recovery algorithm includes a procedure to assess whether a change has occurred that invalidates the calibrated values, and subsequently includes moving the moving body to multiple separate positions by applying different drive signals to the two OIS actuators and then recording measurements from the position sensors.

Some embodiments include a camera module. In some embodiments, the camera module includes a lens, a digital image sensor, and optical image stabilization actuators to move a moving body so as to compensate for handshake. Some embodiments include a position sensor. In some embodiments, the position sensor is configured for measuring movements of a camera module stabilized by the optical image stabilization system. Some embodiments include an optical image stabilization control system for calculating from the movements a calculated position of the moving body. Some embodiments include an actuator control for generating calculated electrical signals to move at least two actuators to achieve the calculated position of the moving body. In some embodiments, the actuator control system receives measurements from positions sensors that assess the position of the moving body.

In some embodiments, open loop drive signals applied to the optical image stabilization actuators are used to adjust the measurements from the position sensor so as to improve the assessment of the position of the moving body and compensate for crosstalk between the axes of the optical image stabilization actuators.

In some embodiments, the optical image stabilization actuators comprise voice coil motors. In some embodiments, the voice coil motors comprise magnets for moving the moving body. In some embodiments, the position sensors comprise at least two Hall sensors, one for each actuator axis. In some embodiments, each of the Hall sensors detects one component of the magnetic field produced by one magnet used for the actuator of each actuator axis.

In some embodiments, a current applied to the actuators adjusts a voltage sensed by the Hall sensors so as to compensate for the effects of crosstalk between the axes. In some embodiments, drive signals applied to the actuators adjust the measurements from the position sensors so as to improve assessment of the position of the moving body.

In some embodiments, drive signals applied to the actuators compensate for crosstalk between the axes of the actuators. In some embodiments, open loop drive signals applied to the actuators adjust the measurements from the position sensors so as to improve the assessment of the position of the moving body and improve assessment of the position of the moving body.

Some embodiments include an optical image stabilization system. In some embodiments, the optical image stabilization system includes a sensor for measuring user handshake, an optical image stabilization control system for, based at least in part upon the measured user handshake, calculating a calculated position of a moving body and an actuator control system for generating calculated electrical signals to move at least two actuators to achieve the calculated position of the moving body, wherein the actuator control system also receives measurements from positions sensors to assess the position of the moving body.

In some embodiments, the optical image stabilization system is incorporated into a camera module including a lens, a digital image sensor, and optical image stabilization actuators to move the moving body. In some embodiments, the camera module is calibrated during manufacture to record, for multiple recorded positions of the moving body, the applied open loop drive signals to the optical image stabilization actuators and the position sensor measurements.

In some embodiments, the optical image stabilization actuators comprise voice coil motors, the voice coil motors include magnets for moving the moving body, and the position sensors comprise at least two Hall sensors, one for each actuator axis.

In some embodiments, each Hall sensor detects one component of the magnetic field produced by one magnet used for the actuator of each axis. Some embodiments further comprise a computer readable medium storing program instructions, which, when executed, cause the optical image stabilization system perform recovering from mechanical changes to the camera module that render stored calibration values incorrect.

In some embodiments, the computer readable medium further stores program instructions which, when executed, perform assessing whether a change has occurred that invalidates stored calibration values, and moving the moving body to multiple separate positions by applying different drive signals to the two optical image stabilization actuators and then recording measurements from the position sensors at each of the positions.

Figure 5A:
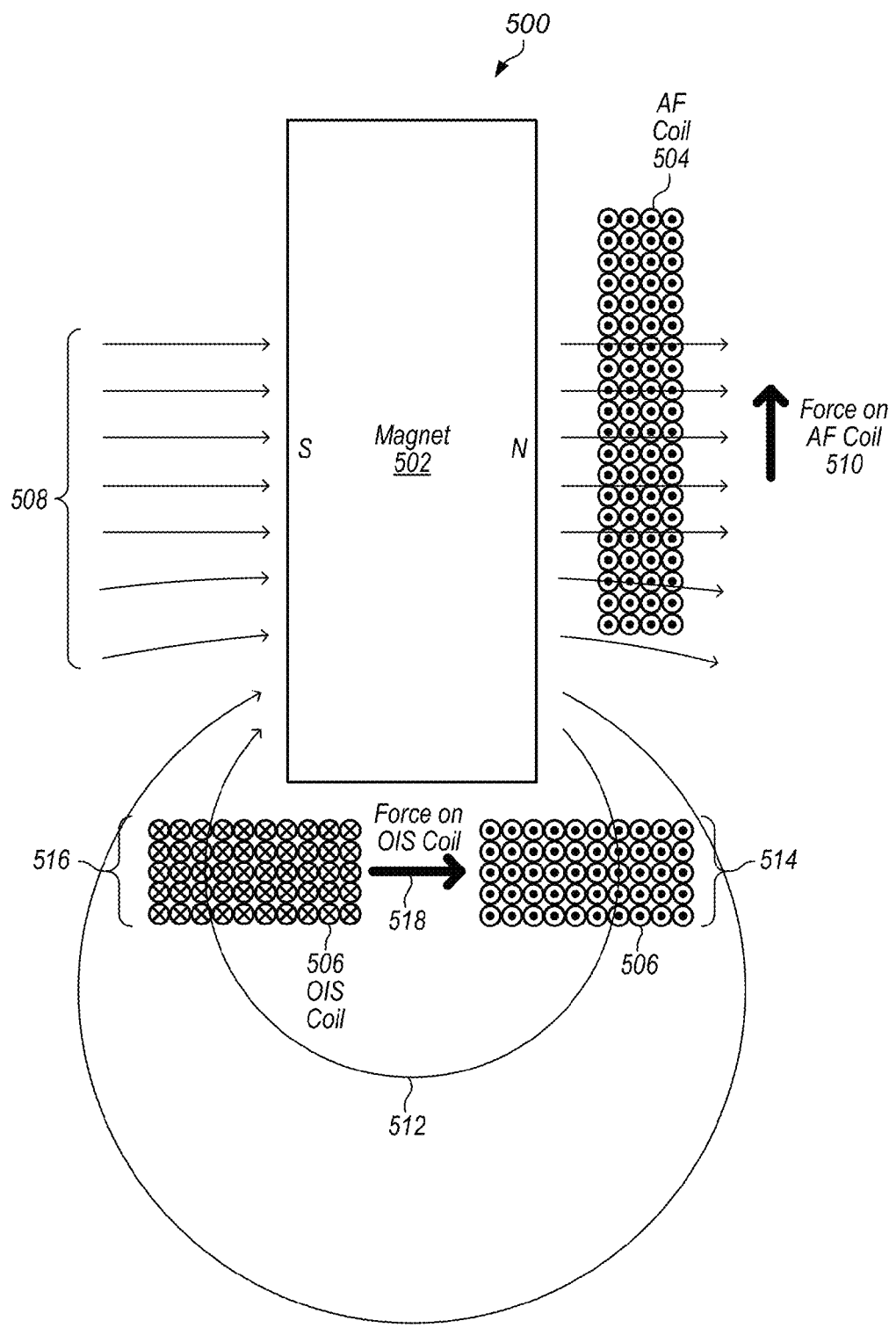
FIG. 5A illustrates a schematic view of a hall sensor, coil and magnet, according to at least some embodiments.

FIG. 5A illustrates a schematic view of a hall sensor, coil and magnet, according to at least some embodiments. FIG. 5A is a schematic representation 500 of a cross-section through one magnet 502, the autofocus coil 504 and an optical image stabilization coil 506. A magnetic field component 508 is 'horizontal' and enables the Lorentz force for the autofocus function 510. However, also note that the fringing field 512 cuts through each half of the optical image stabilization coil 506, with the 'vertical' component of the field 512 in the opposite direction in each half of the optical image stabilization coil 506. Note also that since the optical image stabilization coil 506 is contiguous, the direction of current flow in each half of the optical image stabilization coil 506 is also opposite. This is illustrated by the 'dots' 514 in each wire of one half of optical image stabilization coil 506 indicating current coming out of the page, whilst the 'crosses' 516 in each wire of the other half of optical image stabilization coil 506 indicating current going into the page. Hence the Lorentz force 518 generated in each half of optical image stabilization coil 506 is in the same direction, in this case to the right. And the Lorentz force in the autofocus coil 510 is upwards.

Figure 5B:
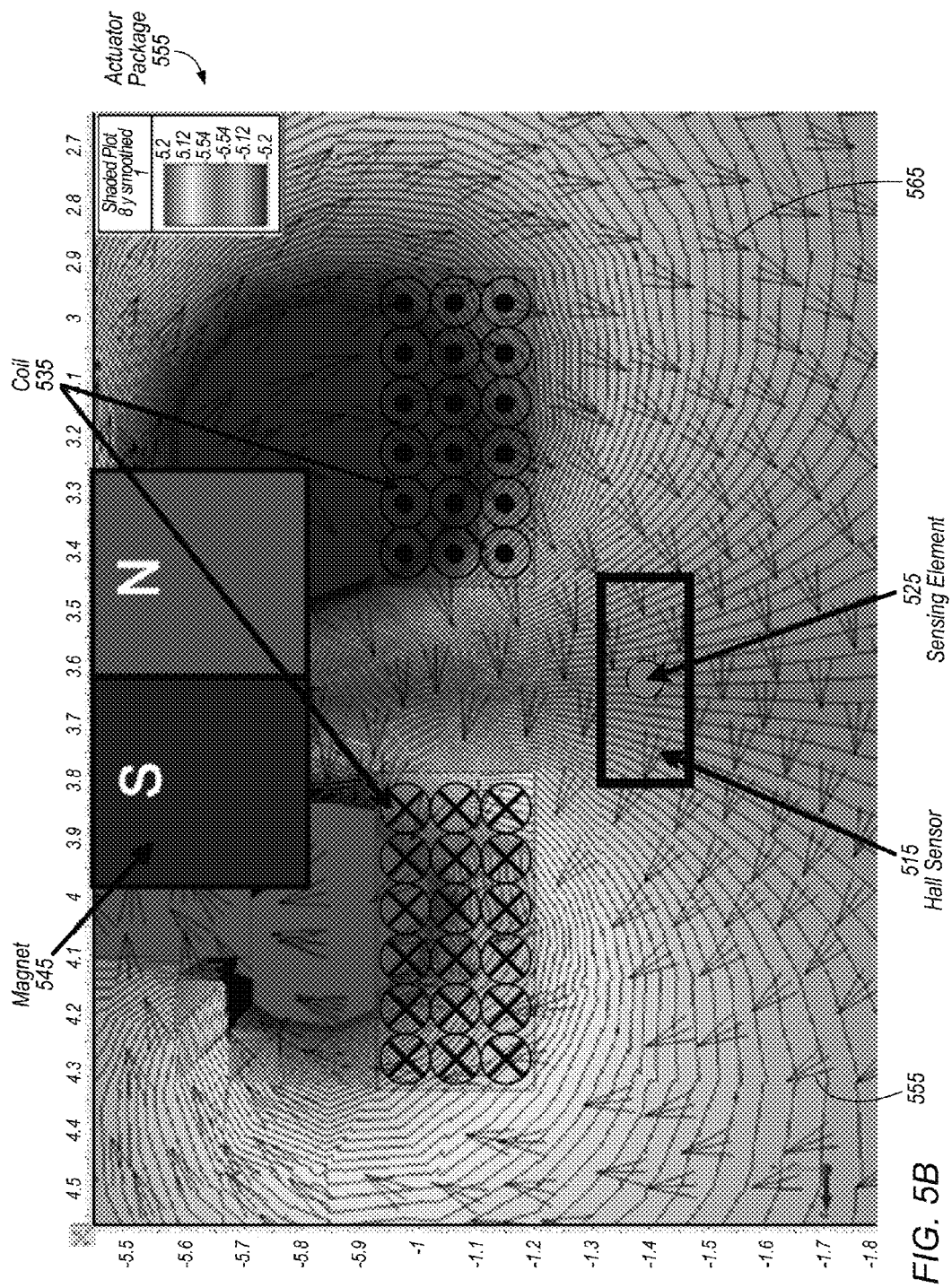
FIG. 5B illustrates a magnetic field with a schematic view of a hall sensor, coil and magnet, according to at least some embodiments.

FIG. 5B illustrates a magnetic field with a schematic view of a hall sensor, coil and magnet, according to at least some embodiments. An actuator package 555 includes a magnet 545 and a coil 535, as well as a hall sensor 515 with a sensing element 525. FIG. 5 shows a schematic cross-section of one part of the optical image stabilization actuator package 555. Shown is a magnet 545, which moves, with field lines showing a representation of the magnetic field 565 being produced by the magnet 545. The arrows 555 show the direction of the field 565, and shows how the field 565 curves around the magnetic from the north to the south poles. FIG. 5 also shows a cross-section of the drive coil 535, and the Hall sensor 515, both of which are fixed and do not move in some embodiments. As viewed in the orientation of FIG. 5, it is the vertical component of the magnetic field 565 that interacts with the coil 535 to generate Lorentz forces to the left or right (specifically to the right given the current direction implied by the dots and crosses in the coil cross-section).

The Hall sensor 515 is also responsive to the vertical component of the magnetic field 565, but is insensitive to the horizontal component. This means that in the hypothetical case, where the magnet 545 is centered, the Hall sensor 515 output is close to zero (in practice the Hall sensor 515 will frequently have an offset voltage). It is assumed that at the time of manufacture, an actuator package 555 will undergo a calibration stage, whereby the actuator package 515 is exercised, and its actual position is measured by an external sensor, whilst the drive current required to hold the measured position, AND the Hall sensor 515 reading are both measured, correlated with the external measure of position, and stored in a look-up table. From these values, both the voice coil motor sensitivity and the Hall sensor 515 gain can be determined under the environmental conditions of the actual test.

Figure 5C:
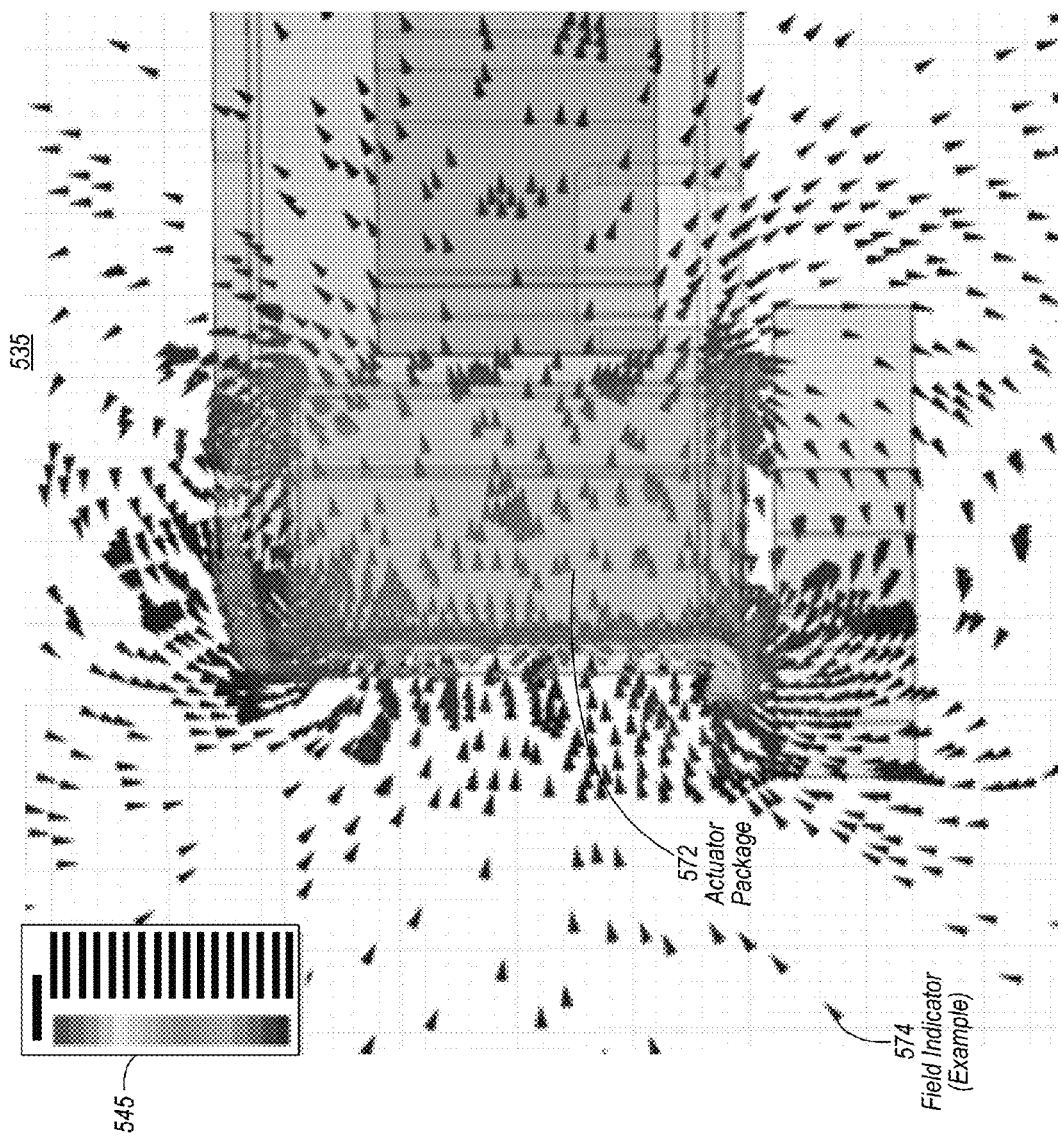
FIG. 5C depicts a cutaway view of a hall sensor, coil and magnet, according to at least some embodiments.

FIG. 5C depicts a cutaway view of a hall sensor, coil and magnet, according to at least some embodiments. Actuator package 572 is surrounded by field indicator (example 574). The Lorentz force for the OIS actuators of actuator package 572 is generated from the fringing field of the magnets, revealed by field indicators exemplified by example field indicator 574. It is only the vertical component (as viewed in these figures) of the magnetic field, which contributes to the useful Lorentz force in directions orthogonal to the optical axis. The relative positions of the Magnet, AF coil and OIS coil can be seen, but are not labeled. In addition, FIG. 5C shows the position of the Hall sensor, located under the OIS Coil.

When viewed as in FIG. 5C, the Hall sensor is configured such that it generated a sensed voltage due to the Hall effect in response to a vertical magnetic field. The voltage is to first order proportional to the magnitude of the vertical component of the magnetic field, and changes sign depending on the direction of the vertical component of the magnetic field. The horizontal component of the magnetic field does not generate a voltage that is sensed.

With the aid of FIGS. 5A-5C, it may be appreciated that there is a locus of positions, below the magnet where, owing to the curved path of the fringing field, the Hall sensor may be placed and there is no net vertical component of magnetic field, and hence no sensed voltage output from the Hall sensor (neglecting any offset that may be caused by a number of manufacturing variations in any or all of the component the system). With the Hall sensor stationary, if the magnet in FIG. 5A-5C moves to the right, there is now a net vertical component to the magnetic field passing through the Hall sensor in the vertically upwards direction. Likewise, if the magnet moves to the left relative to the Hall sensors, there will be a net vertically down component to the magnetic field.

Figure 6:
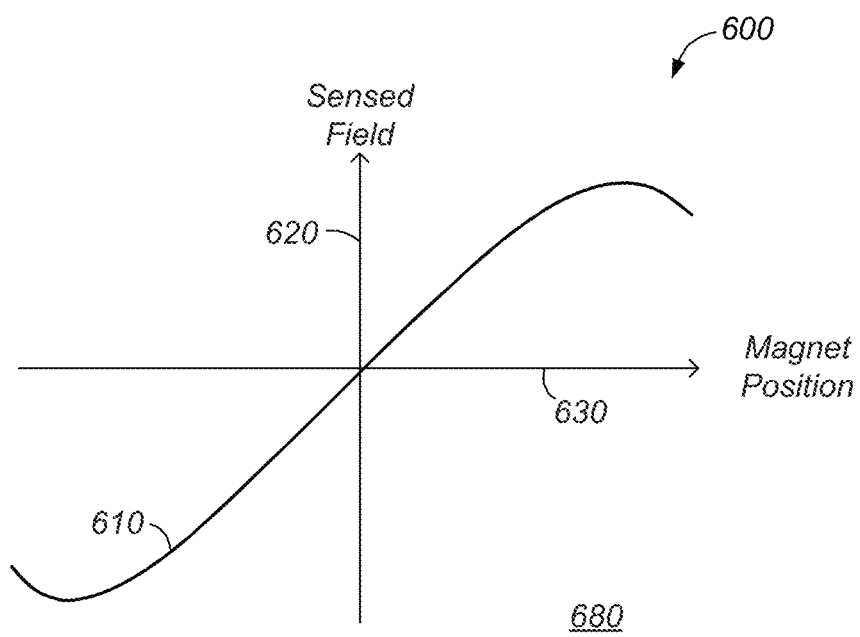
FIG. 6 illustrates a plot of a relationship between hall sensor voltage and magnet position, according to at least some embodiments.

FIG. 6 depicts a plot of a relationship between a sensed magnetic field and magnet position, according to at least some embodiments. Graph 600 includes a sensed field curve 610 indicating that sensed field 620 changes as a function of magnet position 630. Note that for range of positions the Hall sensor output is approximately linear with magnet position 630. FIG. 6 gives a rough representation of how the net vertical component of the magnetic field through the Hall sensor varies for some embodiments with magnet position relative to the Hall sensor for linear movements along the direction of travel of the actuator. As will be apparent to one of skill in the art in light of having read the present disclosure, in some embodiments it may be seen that for large displacements, the magnetic field is highly non-linear with magnet position. However for small movements, the change in magnetic field with magnet position is relatively linear for some embodiments. For this reason, this configuration is suitable to allow the Hall sensor voltage output of some embodiments to be a good measure of actuator position, and hence a good candidate to act as feedback parameter monitoring the position of the moving body relative to the image sensor, and hence enable closed loop position control.

Some embodiments address various phenomena that would otherwise lead to excessive crosstalk between the axes. As discussed, there are at least two OIS axes that nominally move the moving body in orthogonal directions. In some embodiments, the moving body includes the lens, but not the image sensor, and the two directions would ideally be linear movements orthogonal to the optical axis and orthogonal to each other. In some embodiments, the directions of each actuator are nominally diagonally across the substantially rectangular plan view of the camera module, each nominally angled at 45 degrees to one side of the image sensor. In some embodiments, each axis has two magnets and two OIS coils. Under at least one magnet in each axis is mounted a Hall sensor to sense the movement of this axis. Hence, in some embodiments, there are at least two Hall sensors.

In some embodiments, movement of one axis will generate a sensed output voltage from its at least one Hall sensor, whilst generating no output from the at least one Hall sensor of the second orthogonal axis. In practice there are several effects that will lead to an output in the at least one Hall sensor of the second orthogonal axis. For example, the two axes may not move in complete orthogonal directions due to manufacturing tolerances. The magnetic field from each magnet may not be the same across its width, hence a movement in one axis will alter the magnetic field cutting the at least one hall sensor of the second axis. A movement in one axis may cause a small parasitic motion along the optical axis, since the suspension mechanism is no ideal. A small movement along the optical axis will change the gain, offset and linearity of the at least one Hall sensor of the second axis. A movement in one axis may cause a small parasitic rotation about the optical axis, since the suspension mechanism is no ideal, and the torques generated around the optical axis from each magnet and coil in the one axis may not complete balance each other. Such a rotation will register as a movement of the Magnets of the second axis. There may be other phenomena that lead to a crosstalk effect. The upshot of these crosstalk phenomena is that since a movement in one axis causes a parasitic reading of movement in the second axis, and vice versa, a pair of position measurements from the at least one Hall sensor in each axis does not correspond to a unique position in 2D space; there is some uncertainty in the position.

In some embodiments, problems such as those listed above are mitigated. In some embodiments, positional uncertainty is reduced by making use of factory calibration and the open-loop characteristics of the two OIS actuators. In some embodiments, the current applied to a coil will generate a force. However, since the actuator operates against at least one spring, the spring will turn this force into a displacement. Therefore, neglecting dynamic effects and hysteresis in the mechanism, a different applied arbitrary current to each OIS actuator axis will produce a unique position of the moving body. This open-loop characteristic, which can be measured and stored at the time of manufacture, along with the associated Hall sensor output readings can be used to provide an 'open-loop' correction to the Hall sensor readings, and hence cut down the position uncertainty. Some embodiments also address changes in the actuator over the lifetime of the device, and how this can be compensated for.

As may be appreciated, in some embodiments manufacturing tolerances may alter the relative position between the magnet and Hall sensor in 3D space. For a given movement of the magnet relative to the Hall sensor, this variation in absolute position from device to device will affect the sensitivity (gain) of the Hall sensor output, the offset in the Hall sensor output (for example the output for zero applied current to the OIS coils when the Camera is pointing directly upwards, and the linearity of the Hall sensor response. In some embodiments, the Hall sensor output varies for different absolute positions of the Hall sensor relative to the magnet in X Y space (i.e. the space orthogonal to the optical axis).

In some embodiments, at the time of manufacture, the sensitivity, offset and linearity of each Hall sensor can be measured and stored (calibrated) so as to account for and correct these effects. In this way, the raw Hall sensor data can be manipulated so as to produce a more accurate and linearity approximation to position. During this calibration, data can be stored for the Hall sensor outputs of the at least one Hall sensor in each axis, so as to also characterize the crosstalk. The calibration maps the Hall sensor outputs to particular positions of the lens relative to the image sensor. There are various methods of assessing this true relative position of the Lens. However the preferred approach is to capture images of a test chart using the image sensor, and hence an assessment of the lens position relative to the image sensor can be made by processing the captured images.

Some embodiments also measure and store the open-loop applied current to each actuator associated with a given position as assessed by the captured images, along with the measured Hall sensor output. In this way a given data set consists of six pieces of data: X and Y position of the lens relative to the image sensor, applied drive current to each actuator, measured Hall sensor output for each actuator.

In some embodiments, these data are stored for multiple relative lens positions. Embodiments will differ with respect to the number of positions used. However, in some embodiments five images are captured at relatively evenly spaced positions along each axis, so as to estimate any non-linear behavior, both in the Hall sensor output, and applied current input. In some embodiments ten images are used to assess linearity in both axes. In addition, further images are in some embodiments used to assess crosstalk, and open-loop hysteresis. Some embodiments combine the use made for the different images, and place them appropriately so that roughly only 10 images are used for all the calibration needs, leading in some embodiments to a stored calibration table with sixty entries.

In some embodiments, these data could be used to assess the following actuator parameters:

The line of action of each actuator relative to the image sensor (the nominal being at 45 degrees to one side).

The open loop sensitivity of the actuator (change in position for change in applied current).

The Hall sensor sensitivity for each axis (change in voltage output for a change in position).

The Hall sensor offset for each axis (Hall sensor output at a particular position, such as the actuator 'power off' position when the camera is facing upwards).

The open loop linearity of each actuator (linearity of applied current to position).

The Hall sensor linearity for each axis (linearity of voltage output with changing position).

The crosstalk in Hall sensor output for each axis (change in voltage output for changing position of the other axis).

The open loop crosstalk for each axis (movement in the second axis for an applied current to the first)

Some embodiments store position (based on imaging the test chart), applied actuator current, and Hall sensor for the mechanical end-stops of the actuators. In some embodiments, these end-stops limit the travel of the actuators to prevent damage, but their positions relative to the image sensor are unlikely to change over the lifetime of the device. In some embodiments, in all four linear directions, one way to reach these end stops by driving the actuators is to increment the current to the actuator until the moving body stops moving, as detected by either the Hall sensor output, or the images of the test chart from the image sensor. Then the applied current, output Hall sensor voltage, and position based on the image capture are stored for this end-stop.

Some embodiments address the problem that, over the course of the lifetime of the device, the properties may change. One main concern addressed by some embodiments is associated with a change to the position of the magnet relative to the Hall sensor for each axis in directions parallel to the optical axis. Such a change might be caused for example by a drop event, where the user drops the product, and there is a small amount of plasticity in the spring suspension mechanism owing to the very high accelerations experienced. Based on experience from such mechanisms, such a small amount of plasticity is unlikely to affect the stiffness of the mechanism in some embodiments, or significantly effect its function, by it may change the absolute position of the moving body relative to the Hall sensors.

Given the relative sensitivity in some embodiments of the Hall sensor gain, offset and linearity of magnet movements to the absolute position of the magnet relative to the Hall sensor, a change in this position may potentially change all these parameters and render the calibration values inappropriate. Some embodiments use the open-loop characteristics of the actuator to recover from such an event and recalibrate the actuators in the installed product. As stated above, it is assumed that, in some embodiments, the open-loop characteristics of the actuator are more stable through an event such as a drop event.

One simple example is open-loop linearity. Take the scenario that a drop event has occurred. The absolute position of the moving body (including magnets) relative to the Hall sensors (and Image Sensor) has changed by a small amount. This has changed all the Hall sensor parameters, changed the power-off neutral position of the lens relative to the image sensor, and changed the open-loop gain of the actuators. However, assume that the open-loop linearity of the actuators is maintained.

An example algorithm may work something like this:

The camera is turned on.

The accelerometer and/or compass in the mobile device is poled and used to assess device orientation.

Based on the calibration of the camera at manufacture, as assessment is made of the expected Hall sensor output voltages when the actuators are unpowered.

The actual Hall sensors outputs are measured and recorded with the actuators unpowered.

Some averaging may be required to account for user hand movements.

The actual outputs are compared to the expected outputs

If they agree to tolerable accuracy, the system assumes the factory calibration values are still valid, and the system operates as normal correcting the raw Hall sensor outputs as appropriate, but using the Hall sensor outputs to essentially provide closed loop feedback on the position of the Moving Body relative the Image Sensor.

If the actual output and expected output do not agree, then run the calibration recovery algorithm.

Do a current sweep separately for each actuator, sequentially incrementing (or decrementing) the applied current.

At each current increment record the Hall sensor output from both Hall sensors.

If possible, at each position assess the relative illumination in captured images to ensure no dark corners (i.e. that the image circle of the Lens is illuminating the complete image sensor)

Determine whether there are any mechanical end-stops inhibiting motion within the operational range, or whether there are dark corners in the image, implying a boundary to the image circle is reached. (** see note below)

If the full range of travel is possible (−100 mA to +100 mA in both axes) without inhibited motion or dark corners, recalculate the Hall sensor values that are expected at the neutral position (power-off position) based on the actual measured Hall sensor output at the power-off position, and the device orientation (sets Hall sensor offset values)

Use the Hall sensor measurements made during the Actuator current sweep to recalibrate Hall sensor gain and linearity (assumes the open-loop response is either linear, or has the same linearity as measured in the factory calibration at manufacture).

Store these new calibration values and use them for current and future operation, until such time as a further 'change event' is detected using this algorithm.

If one or more end-stops or image circle limits are detected, use these points to determine the minimum offsets in the Hall sensor measurements from the power-off neutral position that are required to ensure there is adequate operational stroke in all directions without running into an end-stop or image circle limit. Store the power-off Hall sensor measurements, and store the required offset from these to make the zero position for the OIS operation (accounting for device orientation). Use these values for current and future operation of the device, until a further change event is detected.

Use the Hall sensor measurements from the current sweep of the actuator to determine Hall sensor gain and linearity as before.

Operate using these new stored calibration values.

** If the system is able to drive into the mechanical end-stops, these provide a better assessment of absolute position, allowing the optimal operation range (offset to the Hall sensor neutral position measurements) to be set.

Hence, some embodiments using the assumption of open loop linearity of the actuator, are able to recover from small changes to the actuator as calibrated.

Some embodiments are designed with the assumption that all the stored factory calibration values are valid, but as above the assumption is that during calibration, the open loop current required to hold a position (as determined by the test chart recorded images) are recorded at the same time as the Hall sensor output voltage.

As discussed, there are a number of crosstalk issues that may lead to a given output of Hall sensor voltages corresponding to multiple positions of the moving body. Some embodiments make use of the fact the neglecting hysteresis and dynamic effects, a given pair of open loop applied currents will correspond with a unique position. In practice, the actuator mechanism of some embodiments will have a small amount of hysteresis. In some embodiments, the dynamic effects should indeed be negligible, owing to the closed loop operation, and the filtering to the input signal for OIS movements.

If there were no Hall sensors in the system, the open-loop performance of the actuator would still produce tolerance results in some embodiments. The presence of the hall sensors in some embodiments will improve the positional accuracy, however, Hall sensor readings are also prone to error and indeterminacy in some embodiments. Hence, in some embodiments an augmentation is to use both the open loop and closed loop effects together. In some embodiments, the open-loop parameters are used to apply a 'correction' to the Hall sensor output to reduce the indeterminacy and increase accuracy. As discussed above, the presence of crosstalk in some embodiments means that a pair of Hall sensor readings from the two axes could correspond to multiple different positions. Some embodiments of the compensation algorithm take the open loop current applied to each actuator as an input, and then estimates the crosstalk in each Hall sensor reading, and hence reduces or eliminates the region of uncertainty.

Figure 7:
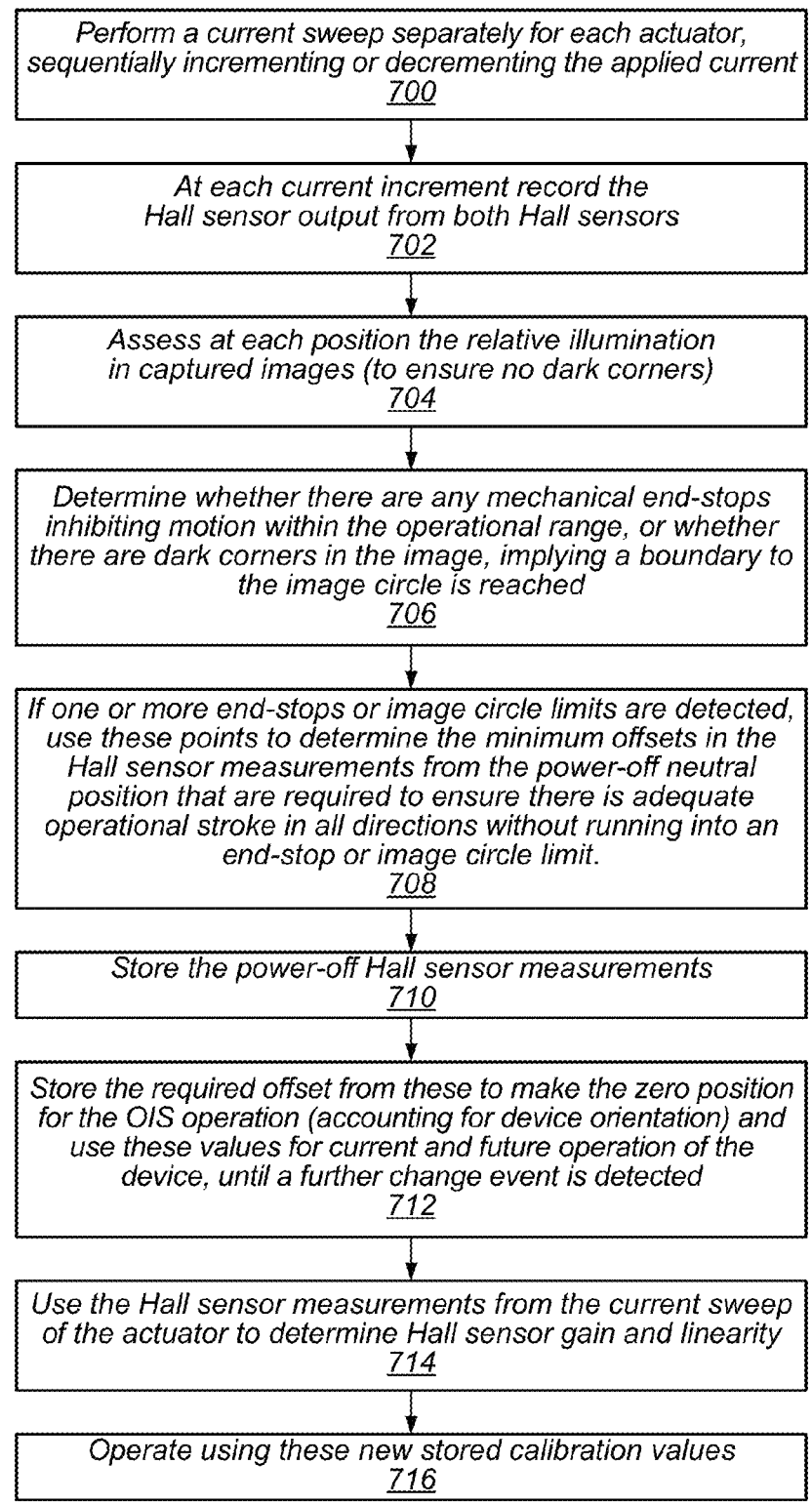
FIG. 7 is a flowchart of a method for camera component control, according to some embodiments.

FIG. 7 is a flowchart of a method for camera component control, according to some embodiments. A current sweep is performed separately for each actuator, sequentially incrementing or decrementing the applied current (block 700). At each current increment, the Hall sensor output from both Hall sensors is recorded (block 702). At each position the relative illumination in captured images is assessed to ensure no dark corners (block 704). Whether there are any mechanical end-stops inhibiting motion within the operational range, or whether there are dark corners in the image, implying a boundary to the image circle is reached is determined (block 706).

If one or more end-stops or image circle limits are detected, these points are used to determine the minimum offsets in the Hall sensor measurements from the power-off neutral position that are required to ensure there is adequate operational stroke in all directions without running into an end-stop or image circle limit. (block 708). The power-off Hall sensor measurements are stored (block 710). The required offset from these to make the zero position for the OIS operation (accounting for device orientation) are stored and these values are used for current and future operation of the device, until a further change event is detected (block 712). The Hall sensor measurements from the current sweep of the actuator are used to determine Hall sensor gain and linearity (block 714). Operations continue using these new stored calibration values (block 716).

Figure 8:
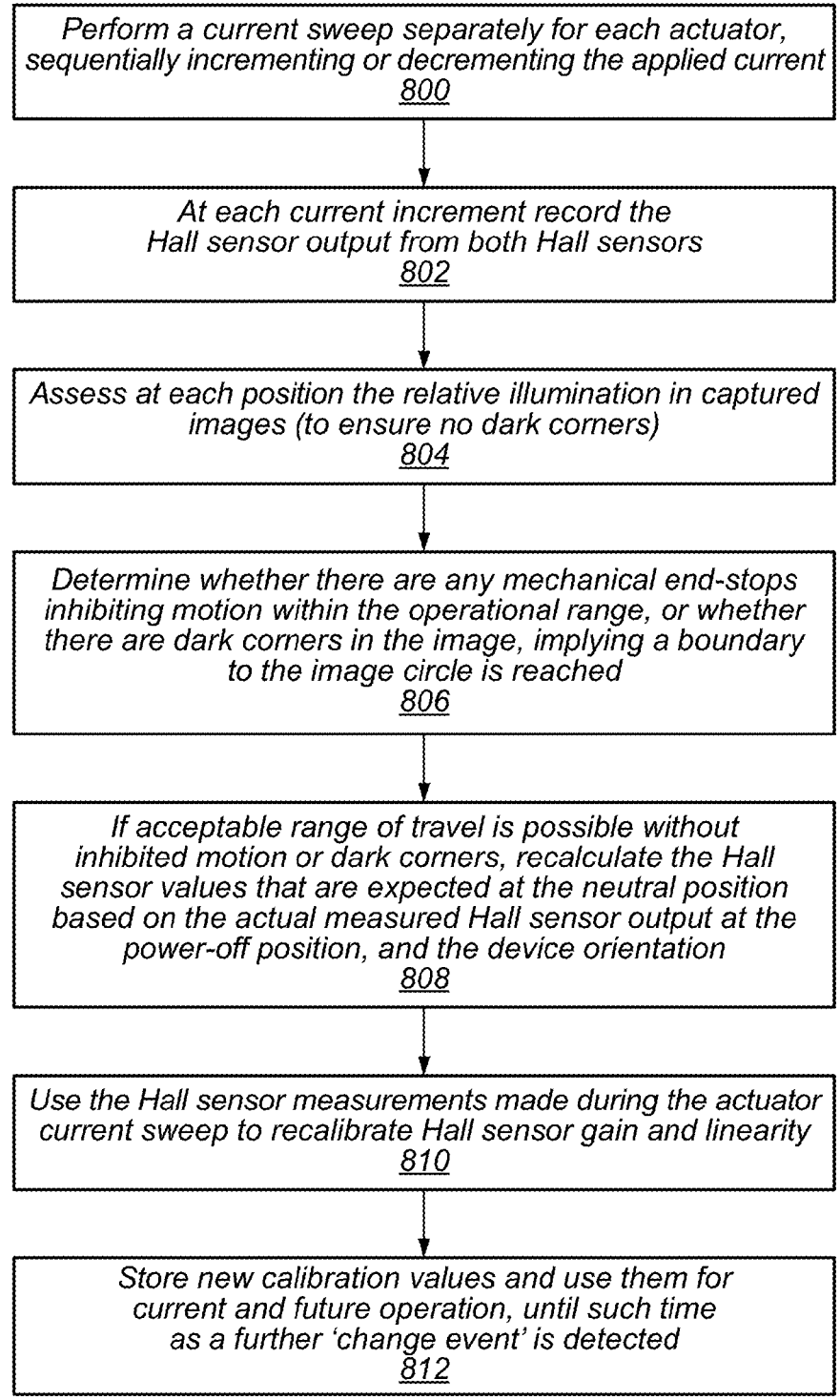
FIG. 8 is a flowchart of a method for camera component control, according to some embodiments.

FIG. 8 is a flowchart of a method for camera component control, according to some embodiments. A current sweep is performed separately for each actuator, sequentially incrementing or decrementing the applied current (block 800). At each current increment, the Hall sensor output from both Hall sensors is recorded (block 802). At each position the relative illumination in captured images (to ensure no dark corners) is assesse (block 804). Whether there are any mechanical end-stops inhibiting motion within the operational range, or whether there are dark corners in the image, implying a boundary to the image circle is reached is determined (block 806). If acceptable range of travel is possible without inhibited motion or dark corners, the Hall sensor values that are expected at the neutral position based on the actual measured Hall sensor output at the power-off position, and the device orientation are recalculated (block 808). The Hall sensor measurements made during the actuator current sweep are used to recalibrate Hall sensor gain and linearity (block 810). New calibration values are stored and used for current and future operation, until such time as a further 'change event' is detected (block 812).

Figure 9:
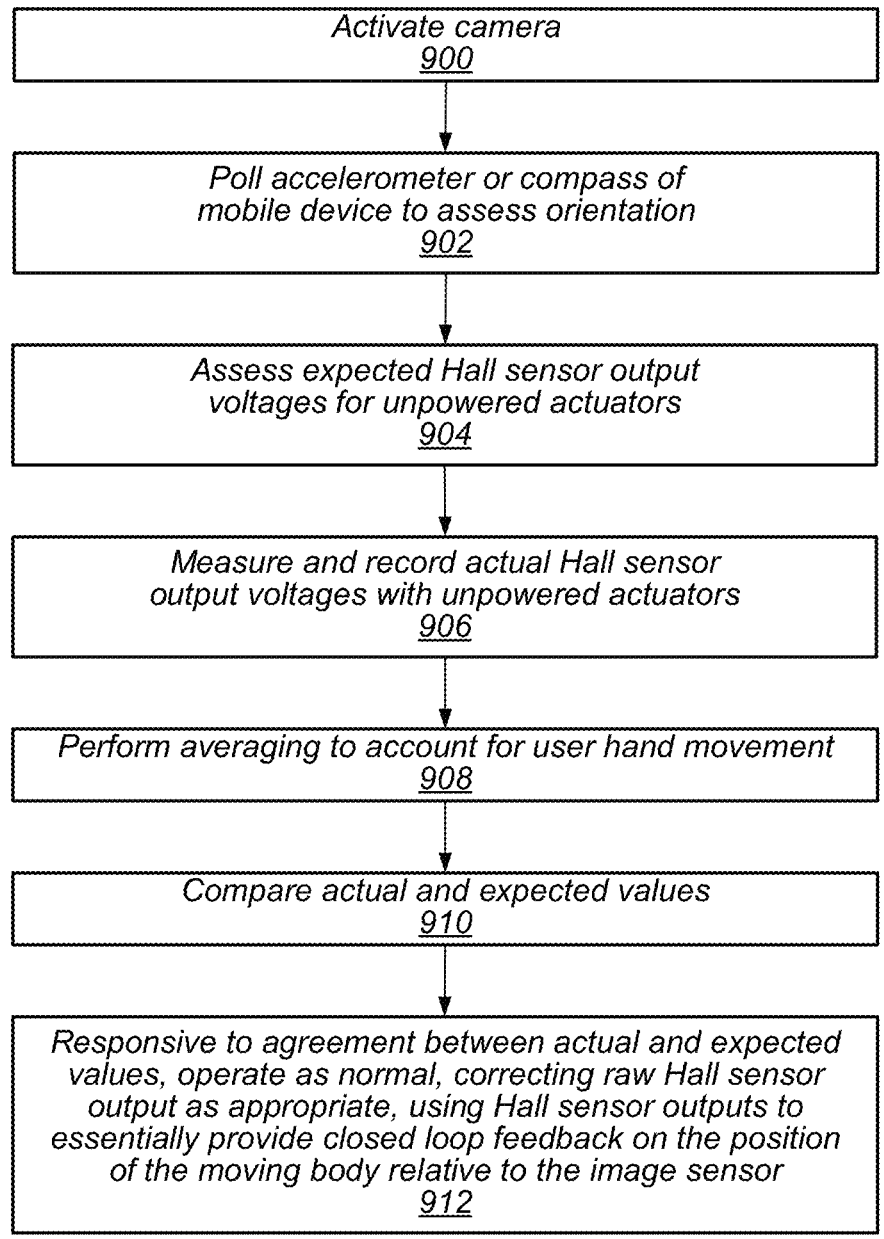
FIG. 9 is a flowchart of a method for camera component control, according to some embodiments.

FIG. 9 is a flowchart of a method for camera component control, according to some embodiments. The camera is activated (block 900). The accelerometer or compass of mobile device is polled to assess orientation (block 902). Expected Hall sensor output voltages for unpowered actuators are assessed (block 904). Actual Hall sensor output voltages with unpowered actuators are recorded (block 906). Averaging is performed to account for user hand movement (block 908). Actual and expected values are compared (block 910). Responsive to agreement between actual and expected values, normal operation is resumed, correcting raw Hall sensor output as appropriate, using Hall sensor outputs to essentially provide closed loop feedback on the position of the moving body relative to the image sensor (block 912).

Figure 10:
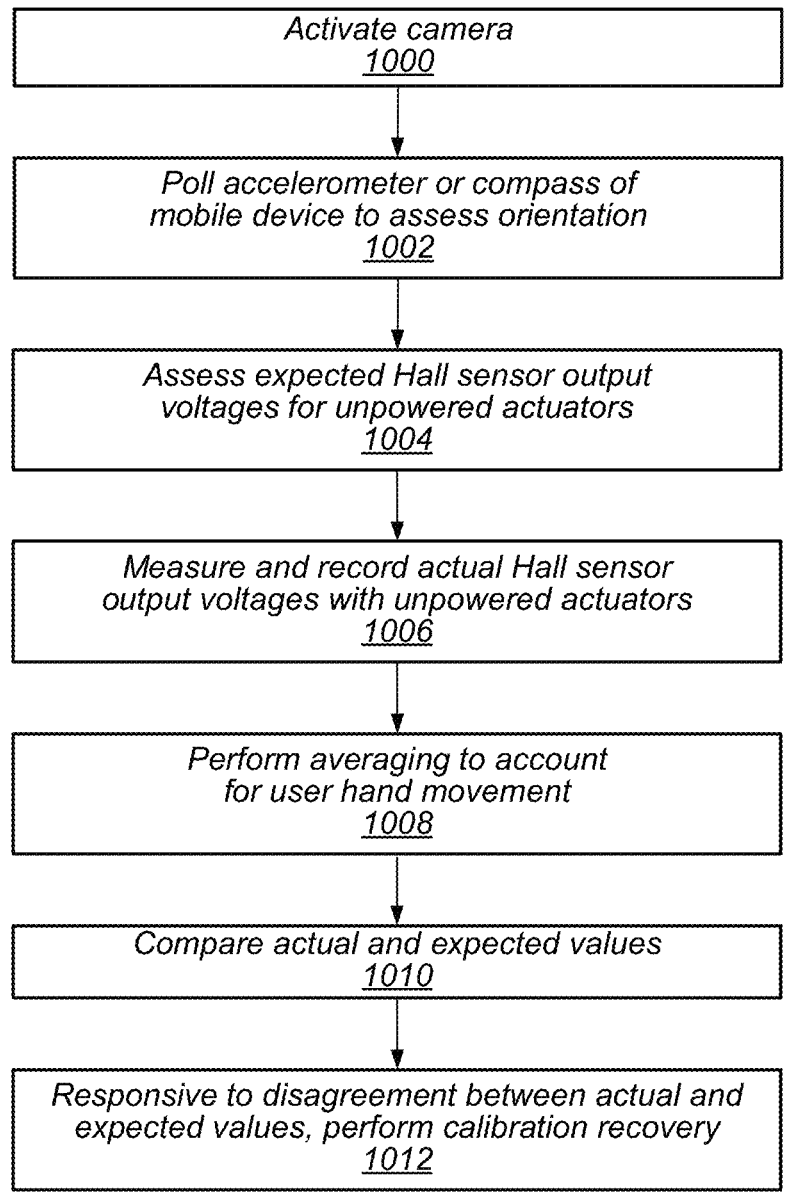
FIG. 10 is a flowchart of a method for camera component control, according to some embodiments.

FIG. 10 is a flowchart of a method for camera component control, according to some embodiments. The camera is activated (block 1000). The accelerometer or compass of mobile device is polled to assess orientation (block 1002). Expected Hall sensor output voltages for unpowered actuators are assessed (block 1004). Actual Hall sensor output voltages with unpowered actuators are measured and recorded (block 1006). Averaging to account for user hand movement is performed (block 1008). Actual and expected values are compared (block 1010). Responsive to disagreement between actual and expected values, calibration recovery is performed (block 1012).

Example Computer System

Figure 11:
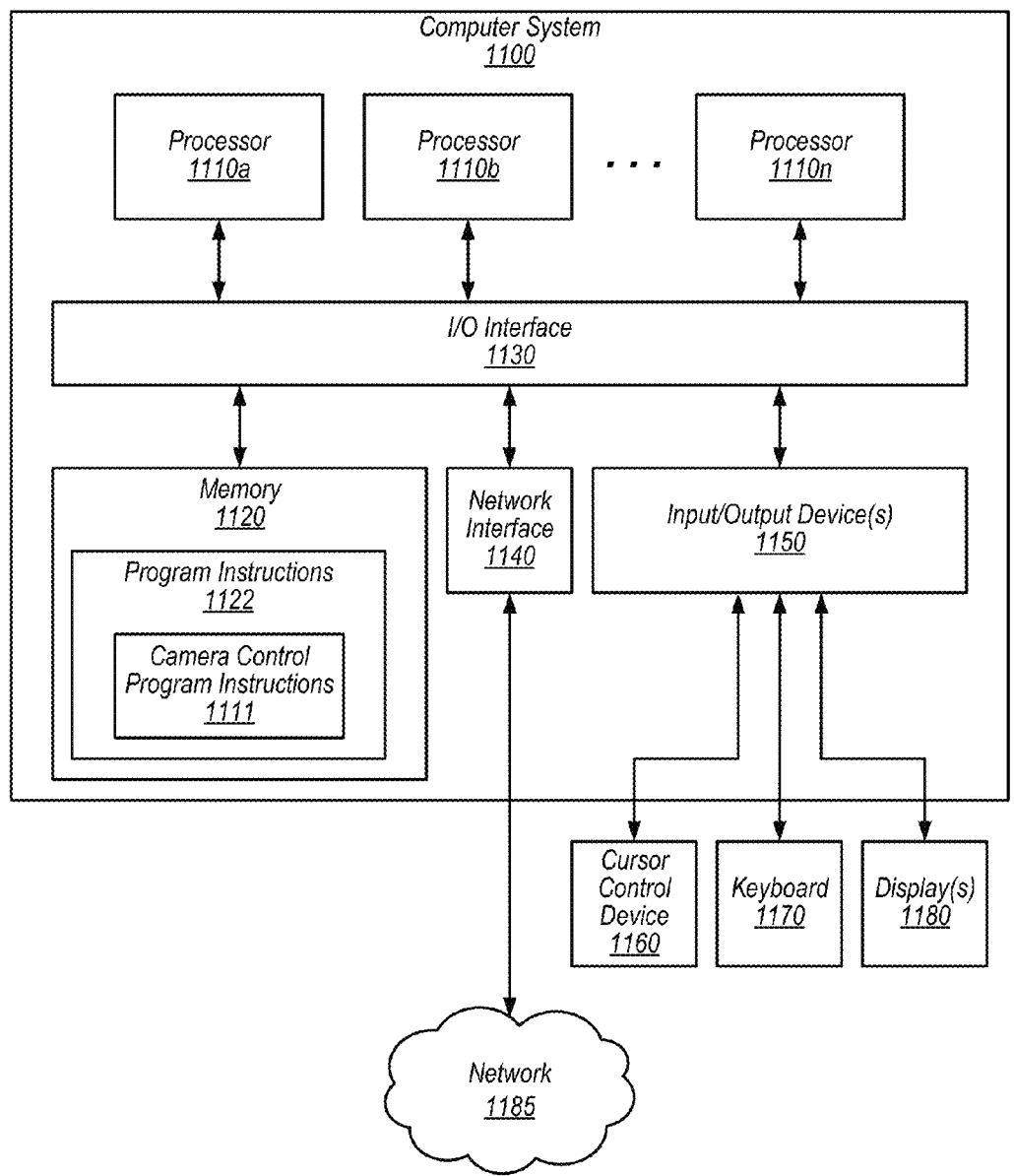
FIG. 11 illustrates an example computer system configured to implement aspects of the system and method for camera control, according to some embodiments.

FIG. 11 illustrates an example computer system 1100 that may be configured to execute any or all of the embodiments described above. In different embodiments, computer system 1100 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of compensation for sensors, as described herein may be executed in one or more computer systems 1100, which may interact with various other devices. Note that any component, action, or functionality described above with respect to FIGS. 1-20 may be implemented on one or more computers configured as computer system 1100 of FIG. 30, according to various embodiments. In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store camera control program instructions 1122 and/or camera control data accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions 1122 may be configured to implement a lens control application 1124 incorporating any of the functionality described above. Additionally, existing camera control data 1132 of memory 1120 may include any of the information or data structures described above. In some embodiments, program instructions and/or data may be received, sent or stored upon different types of computer-accessible media or on similar media separate from system memory 1120 or computer system 1100. While computer system 1100 is described as implementing the functionality of functional blocks of previous Figures, any of the functionality described herein may be implemented via such a computer system.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network 1185 (e.g., carrier or agent devices) or between nodes of computer system 1100. Network 1185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or accessing data by one or more computer systems 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1122, which may be processor-executable to implement any element or action described above. In one embodiment, the program instructions may implement the methods described above. In other embodiments, different elements and data may be included. Note that data may include any data or information described above.

Those skilled in the art will appreciate that computer system 1100 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An optical image stabilization system, comprising:
 a sensor, wherein
  the sensor is configured for measuring movements of a camera module stabilized by the optical image stabilization system;
 an optical image stabilization control system for calculating, based at least in part on the movements measured by the sensor, a calculated position of a moving body, wherein
  the moving body is part of the camera module; and
 an actuator control system for generating calculated electrical signals to drive at least two actuators to move the moving body to the calculated position of the moving body, wherein the actuator control system is configured to:
  receive, as feedback for closed loop position control of the moving body, measurements from positions sensors that assess the position of the moving body, wherein one or more of the measurements from the position sensors include positional uncertainty based at least in part on one or more effects of crosstalk between axes of the actuators; and generate the calculated electrical signals based at least in part on one or more open loop parameters determined to compensate for the positional uncertainty in the one or more of the measurements from the position sensors, wherein the one or more open loop parameters are determined based at least in part on data obtained during a calibration of the camera module.

2. The optical image stabilization system of claim 1, wherein
the optical image stabilization actuators comprise voice coil motors;
the voice coil motors comprise magnets for moving the moving body;
the position sensors comprise at least two Hall sensors, one for each axis corresponding to a respective actuator of the actuators; and
each of the Hall sensors detects one component of the magnetic field produced by one magnet used for the respective actuator.

3. The optical image stabilization system of claim 2, wherein
a current applied to the actuators adjusts a voltage sensed by the Hall sensors so as to compensate for the one or more effects of crosstalk between the axes of the actuators.

4. The optical image stabilization system of claim 1, wherein
drive signals applied to the actuators adjust the measurements from the position sensors so as to improve assessment of the position of the moving body.

5. The optical image stabilization system of claim 1, wherein the movements of the camera module stabilized by the optical image stabilization system include movements resulting from user hand shake.

6. The optical image stabilization system of claim 1, wherein:
during the calibration, multiple open loop drive currents are applied to the actuators to move the moving body to multiple positions relative to an image sensor of the camera module; and
the data obtained during the calibration includes:
the multiple open loop drive currents applied to the actuators;
true positions of the moving body relative to the image sensor; and
position sensor measurements obtained from the position sensors.

7. The optical image stabilization system of claim 6, further comprising:
memory storing the data obtained during the calibration as mapped data that includes, for each of the multiple positions to which the moving body is moved during the calibration:
a respective open loop drive current of the multiple open loop drive currents applied to the actuators;
a respective true position of the true positions of the moving body relative to the image sensor; and
respective position sensor measurements of the position sensor measurements obtained from the position sensors;
wherein, in the mapped data, the respective open loop drive current is mapped to the respective true position and the respective position sensor measurements.

8. A camera module, comprising:
a lens;
a digital image sensor;
optical image stabilization actuators to move a moving body so as to compensate for movements of the camera module;
a sensor
for measuring the movements of the camera module;
an optical image stabilization control system for calculating, based at least in part on the measured movements of the camera module, a calculated position of the moving body; and
an actuator control system for generating calculated electrical signals to move the optical image stabilization actuators to achieve the calculated position of the moving body, wherein the actuator control system is configured to:
receive, as feedback for closed loop position control of the moving body, measurements from position sensors that assess the position of the moving body, wherein one or more of the measurements from the position sensors include positional uncertainty based at least in part on one or more effects of crosstalk between axes of the optical image stabilization actuators; and
generate the calculated electrical signals based at least in part on one or more open loop parameters determined to compensate for the positional uncertainty in the one or more of the measurements from the position sensors, wherein the one or more open loop parameters are determined based at least in part on data obtained during a calibration of the camera module.

9. The camera module of claim 8, wherein
the optical image stabilization actuators comprise voice coil motors;
the voice coil motors comprise magnets for moving the moving body;
the position sensors comprise at least two Hall sensors, one for each axis corresponding to a respective optical image stabilization actuator of the optical image stabilization actuators; and
each of the Hall sensors detects one component of the magnetic field produced by one magnet used for the respective optical image stabilization actuator.

10. The camera module of claim 9, wherein
a current applied to the optical image stabilization actuators adjusts a voltage sensed by the Hall sensors so as to compensate for the effects of crosstalk between the axes of the optical image stabilization actuators.

11. The camera module of claim 8, wherein
drive signals applied to the optical image stabilization actuators adjust the measurements from the position sensors so as to improve assessment of the position of the moving body.

12. The camera module of claim 8, wherein
drive signals applied to the optical image stabilization actuators compensate for crosstalk between axes of the optical image stabilization actuators.

13. The camera module of claim 8, wherein:
during the calibration, multiple open loop drive currents are applied to the actuators to move the moving body to multiple positions relative to an image sensor of the camera module; and
the data obtained during the calibration includes:
the multiple open loop drive currents applied to the actuators;
true positions of the moving body relative to the image sensor; and position sensor measurements obtained from the position sensors.

14. The camera module of claim 13, wherein:
the data obtained during the calibration is recorded as mapped data that includes, for each of the multiple positions to which the moving body is moved during the calibration:
  a respective open loop drive current of the multiple open loop drive currents applied to the actuators;
  a respective true position of the true positions of the moving body relative to the image sensor; and
  respective position sensor measurements of the position sensor measurements obtained from the position sensors;
wherein, in the mapped data, the respective open loop drive current is mapped to the respective true position and the respective position sensor measurements.

15. An optical image stabilization system, comprising:
a sensor for measuring movements of a camera module;
an optical image stabilization control system for calculating, based at least in part upon the measured movements of the camera module, a calculated position of a moving body of the camera module; and
an actuator control system for generating calculated electrical signals to move optical image stabilization actuators to achieve the calculated position of the moving body, wherein the actuator control system is configured to:
  receive, as feedback for closed loop position control of the moving body, measurements from positions sensors to assess the position of the moving body, wherein one or more of the measurements from the position sensors include positional uncertainty based at least in part on one or more effects of crosstalk between axes of the optical image stabilization actuators; and
  generate the calculated electrical signals based at least in part on one or more open loop parameters determined to compensate for the positional uncertainty in the one or more of the measurements from the position sensors, wherein the one or more open loop parameters are determined based at least in part on data obtained during a calibration of the camera module.

16. The optical image stabilization system of claim 15, wherein
the optical image stabilization system is incorporated into the camera module;
the camera module comprises:
  a lens; and
  a digital image sensor;
and
the camera module is calibrated during manufacture to record, for each of multiple recorded positions of the moving body:
  respective open loop drive signals applied to the optical image stabilization actuators; and
  respective position sensor measurements.

17. The optical image stabilization system of claim 16, wherein
the optical image stabilization actuators comprise voice coil motors;
the voice coil motors comprise magnets for moving the moving body, and
the position sensors comprise at least two Hall sensors, one for each axis corresponding to a respective optical image stabilization actuator of the optical image stabilization actuators.

18. The optical image stabilization system of claim 17, wherein
each Hall sensor detects one component of the magnetic field produced by one magnet used for the respective optical image stabilization actuator.

19. The optical image stabilization system of claim 15, further comprising:
a computer readable medium storing program instructions, which, when executed, perform causing the optical image stabilization system to recover from mechanical changes to the camera module that render stored calibration values incorrect.

20. The optical image stabilization system of claim 19, wherein
the computer readable medium further stores program instructions which, when executed, perform:
  assessing whether a change has occurred that invalidates stored calibration values,
  causing the optical image stabilization to move the moving body to multiple separate positions by applying different drive signals to the two optical image stabilization actuators; and
  recording measurements from the position sensors corresponding to each of the multiple separate positions.

* * * * *